United States Patent [19]

Sih

[11] Patent Number: 5,559,881

[45] Date of Patent: *Sep. 24, 1996

[54] NETWORK ECHO CANCELLER

[75] Inventor: Gilbert C. Sih, San Diego, Calif.

[73] Assignee: Qualcomm Incorporated, San Diego, Calif.

[*] Notice: The term of this patent shall not extend beyond the expiration date of Pat. No. 5,307,405.

[21] Appl. No.: 202,520

[22] Filed: Feb. 28, 1994

Related U.S. Application Data

[63] Continuation of Ser. No. 951,074, Sep. 25, 1992, Pat. No. 5,307,405 Apr. 26, 1994.

[51] Int. Cl.$^6$ ........................................................ H04B 3/20
[52] U.S. Cl. ........................... 379/410; 379/406; 379/390; 370/32.1
[58] Field of Search ..................................... 379/406, 407, 379/409, 410, 411, 399, 398, 345, 59, 60, 390; 370/32.1; 375/99

[56] References Cited

U.S. PATENT DOCUMENTS

| | | | |
|---|---|---|---|
| 4,697,261 | 9/1987 | Wang et al. | 370/32.1 |
| 4,764,955 | 8/1988 | Galand et al. | 379/411 |
| 4,782,525 | 11/1988 | Sylvain et al. | 379/410 |

OTHER PUBLICATIONS

"Echo Cancellation in Speech and Data Transmission" by David G. Messerschmitt, *IEEE Journal on Selected Areas in Communication*. vol. Sac-2, No. 2, Mar. 1984, pp. 283–297.
"A Double Talk Detection Method for an Echo Canceller" by S. Minami and T. Kawasaki, *IEEE International Conference on Communications*, 1985, pp. 1492–1497.
"A Fast Adaptive Echo Canceler with Delay Estimation for Time Variant Telephone Circuits" by R. Montagna, L. Nebbia, *IEEE International Conference on Communications*. 1984, pp. 1569–1574.
"Silencing Echoes on the Telephone Network" by Man Mohan Sondhi and David A. Berkey, *Proceedings of the IEEE*, vol. 68, No. 8, Aug. 1980, pp. 948–963.

*Primary Examiner*—Jeffery Hofsass
*Assistant Examiner*—Scott Wolinsky
*Attorney, Agent, or Firm*—Russell B. Miller; Sean English

[57] ABSTRACT

An echo canceller and method for cancelling in a return channel signal an echoed receive channel signal where the echoed receive channel signal is combined by an echo channel with an input return channel signal. The echo canceller has a first filter which generates first filter coefficients, generates a first echo estimate signal with the first filter coefficients, and updates the first filter coefficients in response to a first filter control signal. A first summer subtracts the first echo estimate signal from a combined return channel and echo receive channel signal to generate a first echo residual signal. A second filter generates second filter coefficients, generates a second echo estimate signal with the second filter coefficients, and updates the second filter coefficients in response to a second filter control signal. A second summer subtracts the second echo estimate signal from the combined signal to generate a second echo residual signal, and provides upon the return channel the second echo residual signal. A control unit determines from the receive channel signal, the combined signal, and the first and second echo residual signals, one of a plurality of control states wherein a first control state is indicative of a receive channel signal above a first predetermined energy level, wherein when the control unit is in the first control state it generates the first control signal and generates the second control signal when at least one of a first energy ratio of the first echo residual signal and the combined signal and a second energy ratio of the second echo residual signal and the combined signal exceed a predetermined level.

4 Claims, 11 Drawing Sheets

NETWORK ECHO CANCELLER

This is a continuation of application Ser. No. 07/951,074, filed Sep. 25, 1992, and issued on Apr. 26, 1994 as U.S. Pat. No. 5,307,405.

BACKGROUND OF THE INVENTION

I. Field of the Invention

The present invention relates to communication systems. More particularly, the present invention relates to a novel and improved method and apparatus for cancelling echos in telephone systems.

II. Description of the Related Art

Every current land-based telephone is connected to a central office by a two-wire line (called the customer or subscriber loop) which supports transmission in both directions. However, for calls longer than about 35 miles, the two directions of transmission must be segregated onto physically separate wires, resulting in a four-wire line. The device that interfaces the two-wire and four wire segments is called a hybrid. A typical long-distance telephone circuit can be described as being two-wire in the subscriber loop to the local hybrid, four-wire over the long-haul network to the distant hybrid, and then two-wire to the distant speaker.

Although the use of hybrids facilitates long distance speech transmission, impedance mismatches at the hybrid may result in echos. The speech of the speaker A is reflected off the distant hybrid (the hybrid closest to the speaker B) in the telephone network back toward the speaker A, causing the speaker A to hear an annoying echo of his/her own voice. Network echo cancellers are thus used in the land-based telephone network to eliminate echos caused by impedance mismatches at the hybrids and are typically located in the central office along with the hybrid. The echo canceller located closest to speaker A or B is thus used to cancel the echo caused by the hybrid at the other end of the call.

Network echo cancellers, employed in the land-based telephone system, are typically digital devices so as to facilitate digital transmission of the signals. Since the analog speech signals need to be converted to digital form, a codec located at the central office is typically employed. The analog signals provided from telephone A (speaker A) to central office A are passed through hybrid A and are converted to digital form by codec A. The digital signals are then transmitted to central office B where they are provided to codec B for conversion to analog form. The analog signals are then coupled through hybrid B to the telephone B (speaker B). At the hybrid B, an echo of the speaker A's signal is created. This echo is encoded by the codec B and transmitted back to the central office A. At central office A an echo canceller removes the return echo.

In the conventional analog cellular telephone system, echo cancellers are also employed and are typically located at the base station. These echo cancellers operate in a similar fashion to those in the land-based system to remove unwanted echo.

In a digital cellular telephone system for a call between a mobile station and a land-based telephone, the mobile station speaker's speech is digitized using a codec and then compressed using a vocoder, which models the speech into a set of parameters. The vocoded speech is coded and transmitted digitally over the airwaves. The base station receiver decodes the signal and passes it four-wire to the vocoder decoder, which synthesizes a digital speech signal from the transmitted speech parameters. This synthesized speech is passed to the telephone network over a T1 interface, a time-multiplexed group of 24 voice channels. At some point in the network, usually at the central office, the signal is converted back to analog form and passed to the hybrid at the subscriber loop. At this hybrid the signal is converted to two-wire for transmission over the wire-pair toward the land-based subscriber phone.

For reference purposes, in a cellular call between a mobile station and a land-based telephone, the speaker in the mobile station is the far-end talker and the speaker at the land-based telephone is the near-end talker. As in the land-based system, the speech of the far-end talker is reflected off the distant hybrid in the telephone network back towards the far-end talker. As a result the far-end talker, i.e. mobile station, hears an annoying echo of his/her own voice.

Conventional network echo cancellers typically employ adaptive digital filtering techniques. However, the filter used normally cannot precisely replicate the channel, thus resulting in some residual echo. A center-clipping echo suppressor is then used to eliminate the residual echo. The echo suppressor subjects the signal to a nonlinear function. Synthesized noise can be used to replace signal sections that were set to zero by the center-clipping echo suppressor to prevent the channel from sounding "dead".

Although the just mentioned echo cancellation approach is satisfactory for analog signals, this type of residual echo processing causes a problem in digital telephony. As mentioned previously, in a digital system vocoders are used to compress speech for transmission. Since vocoders are especially sensitive to nonlinear effects, center-clipping causes a degradation in voice quality. Furthermore, the noise replacement techniques used causes a perceptible variation in normal noise characteristics.

It is therefore an object of the present invention to provide a new and improved echo canceller capable of providing high dynamic echo cancellation for improved voice quality.

It is another object of the present invention to provide an echo canceller particularly suited for echo cancellation in the coupling of a digital communication system with an analog communication system.

It is yet another object of the present invention to provide an echo canceller with improved echo cancellation performance for cases where both parties are simultaneously talking.

SUMMARY OF THE INVENTION

The present invention is a novel and improved network echo canceller for digital telephony applications. In accordance with the present invention, an echo canceller is employed wherein the impulse response of the unknown echo channel is identified, a replica of this echo is generated using adaptive filtering techniques, and the echo replica is subtracted from the signal heading toward the far-end talker to cancel the far-end talker echo.

In the present invention, two adaptive filters are used where the step size of each filter is specifically adjusted to optimize each filter for different purposes. One filter, the echo canceller filter, performs the echo cancellation and is optimized for high echo return loss enhancement (ERLE). The second filter, the state filter, is used for state determination and is optimized for fast adaptation.

The present invention differs markedly from conventional echo cancellers in its treatment of doubletalk, where both speakers are talking simultaneously. Conventional echo cancellers cannot detect doubletalk until the adaptive filter that tracks the echo channel has already been slightly corrupted, necessitating the use of a nonlinear center-clipper to remove the residual echo.

The present invention also incorporates a variable adaptation threshold. This novel technique halts filter adaptation immediately at the exact onset of doubletalk, thus preserving the estimated echo channel precisely and obviating the need for the center-clipping to remove the residual echo. As an added feature, the present invention incorporates an improved method of speech detection, which accurately detects speech even in environments containing large amounts of background noise. The present invention also utilizes novel techniques that automatically compensate for flat-delays in the echo channel, and permit fast initial adaptation.

In accordance with the present invention an echo canceller and method for cancelling in a return channel signal an echoed receive channel signal where the echoed receive channel signal is combined by an echo channel with an input return channel signal. The echo canceller has a first filter which generates first filter coefficients, generates a first echo estimate signal with the first filter coefficients, and updates the first filter coefficients in response to a first filter control signal. A first summer subtracts the first echo estimate signal from a combined return channel and echo receive channel signal to generate a first echo residual signal. A second filter generates second filter coefficients, generates a second echo estimate signal with the second filter coefficients, and updates the second filter coefficients in response to a second filter control signal. A second summer subtracts the second echo estimate signal from the combined signal to generate a second echo residual signal, and provides upon the return channel the second echo residual signal. A control unit determines from the receive channel signal, the combined signal, and the first and second echo residual signals, one of a plurality of control states wherein a first control state is indicative of a receive channel signal above a first predetermined energy level, wherein when the control unit is in the first control state it generates the first control signal and generates the second control signal when at least one of a first energy ratio of the first echo residual signal and the combined signal and a second energy ratio of the second echo residual signal and the combined signal exceed a predetermined level.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
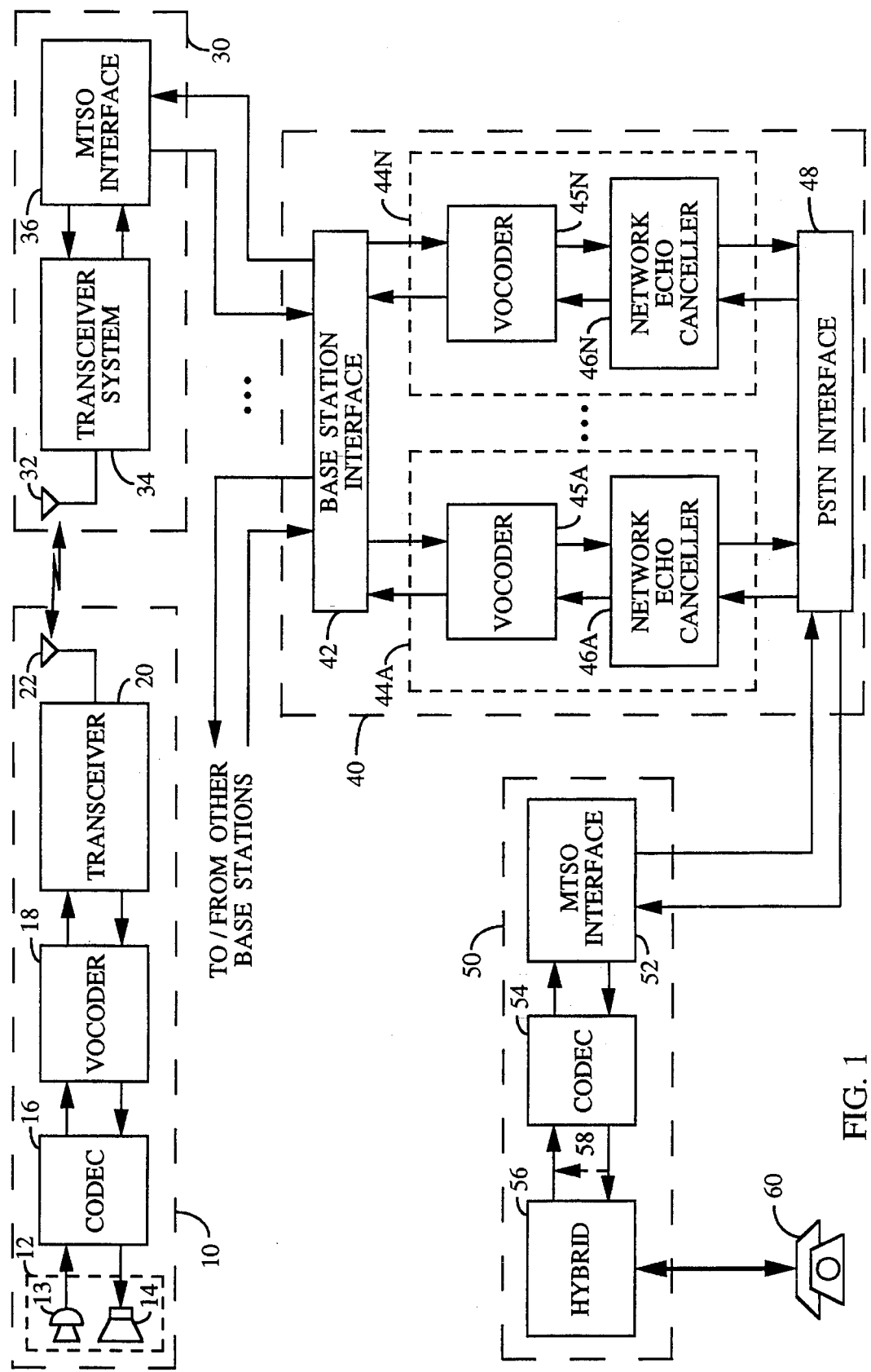
FIG. 1 is a block diagram illustrating an exemplary architecture for a digital cellular telephone system and its interface with a land-based telephone system.

In a cellular communication system, such as a cellular telephone system, which interfaces with a land-based telephone system, a network echo canceller located at the base station cancels echos returning to the mobile station. Referring now to FIG. 1, an exemplary system architecture is provided for a digital cellular telephone system and its interface to a land-based telephone system. This system architecture is defined by operational elements of mobile station 10, cell or base station 30, mobile telephone switching office (MTSO) 40, central office 50, and telephone 60. It should be understood that other architectures may be employed for the system which include a cellular system with a mere change in location or position of the various operational elements. It should also be understood that the echo canceller of the present invention may also be used in replacement of conventional echo cancellers in conventional systems.

Mobile station 10 includes, among other elements not shown, handset 12, which includes microphone 13 and speaker 14; codec 16; vocoder 18; transceiver 20 and antenna 22. The mobile station user's voice is received by microphone 13 where it is coupled to codec 16 and converted to digital form. The digitized voice signal is then compressed by vocoder 18. The vocoded speech is modulated and transmitted digitally over the air by transceiver 20 and antenna 22.

Transceiver 20 may, for example, use digital modulation techniques such as time division multiple access (TDMA) or of the spread spectrum type such as frequency hopping (FH) or code division multiple access (CDMA). An example of CDMA modulation and transmission techniques is disclosed in U.S. Pat. No. 5,103,459, entitled "SYSTEM AND METHOD FOR GENERATING SIGNAL WAVEFORMS IN A CDMA CELLULAR TELEPHONE", issued Apr. 7, 1992, and assigned to the assignee of the present invention, the disclosure of which is incorporated by reference. In such a CDMA system, vocoder 18 is preferably of a variable rate type such as disclosed in copending U.S. patent application Ser. No. 07/713,661, entitled "VARIABLE RATE VOCODER", filed Jun. 11, 1991, and also assigned to the assignee of the present invention, the disclosure of which is also incorporated by reference.

Base station 30 includes among other elements not shown, antenna 32, transceiver system 34 and MTSO interface 36. Base station transceiver system 34 demodulates and decodes the received signals from mobile station 10 and other mobile stations (not shown) and passes them on to MTSO interface 36 for transfer to MTSO 40. The signals may be transferred from base station 40 to MTSO via many different methods such as by microwave, fiber optic, or wireline link.

MTSO 40 includes among other elements not shown, base station interface 42, a plurality of vocoder selector cards 44A–44N, and public switched telephone network (PSTN) interface 48. The signal from base station 30 is received at base station interface 42 and provided to one of vocoder selector cards 44A–44N, for example vocoder selector card 44A.

Each of the vocoder selector cards 44A–44N comprises a respective vocoder 45A–45N and a respective network echo canceller 46A–46N. The vocoder decoder (not shown) contained within each of vocoders 45A–45N synthesizes a digital speech signal from the respective mobile station transmitted speech parameters. These samples are then sent to the respective echo canceller 46A–46N, which passes them on to PSTN interface 48. In this example the signals are provided through vocoder 45A and echo canceller 46A. The synthesized speech samples for each call are then passed through PSTN interface 48 into the telephone network, typically via a wireline T1 interface, i.e., a time-multiplexed group of 24 voice channels, to central office 50.

Central office 50 includes among other elements not shown, MTSO interface 52, codec 54, hybrid 56. The digital signal received at central office 50 through MTSO interface 52 is coupled to codec 54 where it is converted back to analog form and passed on to hybrid 56. At hybrid 56 the analog four-wire signal is converted to two-wire for transmission over the wire-pair toward land-based subscriber telephone 60.

The analog signal output from codec 54 is also reflected off hybrid 56 due to an impedance mismatch. This signal reflection takes the form of an echo signal heading back toward the mobile 10. The reflection or echo path at hybrid 56 is shown by dotted arrow line 58.

In the other direction, the two-wire analog speech signal from telephone 60 is provided to central office 50. At central office 50 the speech signal is converted to four-wire at hybrid 56 and is added to the echo signal traveling toward mobile 10. The combined speech and echo signal is digitized at codec 54 and passed on to MTSO 40 by MTSO interface 52.

At MTSO 40 the signal is received by PSTN interface 48 and sent to echo canceller 46A, which removes the echo before the signal is encoded by vocoder 45A. The vocoded speech signal is forwarded via base station interface 42 to base station 30 and any other appropriate additional base stations for transmission to mobile station 10. The signal transmitted from base station interface 42 is received at base station 30 by MTSO interface 36. The signal is passed on to transceiver system 34 for transmission encoding and modulation, and transmitted upon antenna 32.

The transmitted signal is received upon antenna 22 at mobile station 10 and provided to transceiver 20 for demodulating and decoding. The signal is then provided to the vocoder 18 where the synthesized speech samples are produced. These samples are provided to codec 16 for digital to analog conversion with the analog speech signal provided to speaker 14.

In order to fully understand the echo canceller of the present invention it is helpful to examine the traditional echo canceller and its deficiencies when operating in a digital cellular environment. A block diagram of a traditional network echo canceller (NEC) 100 is shown in FIG. 2.

Figure 2:
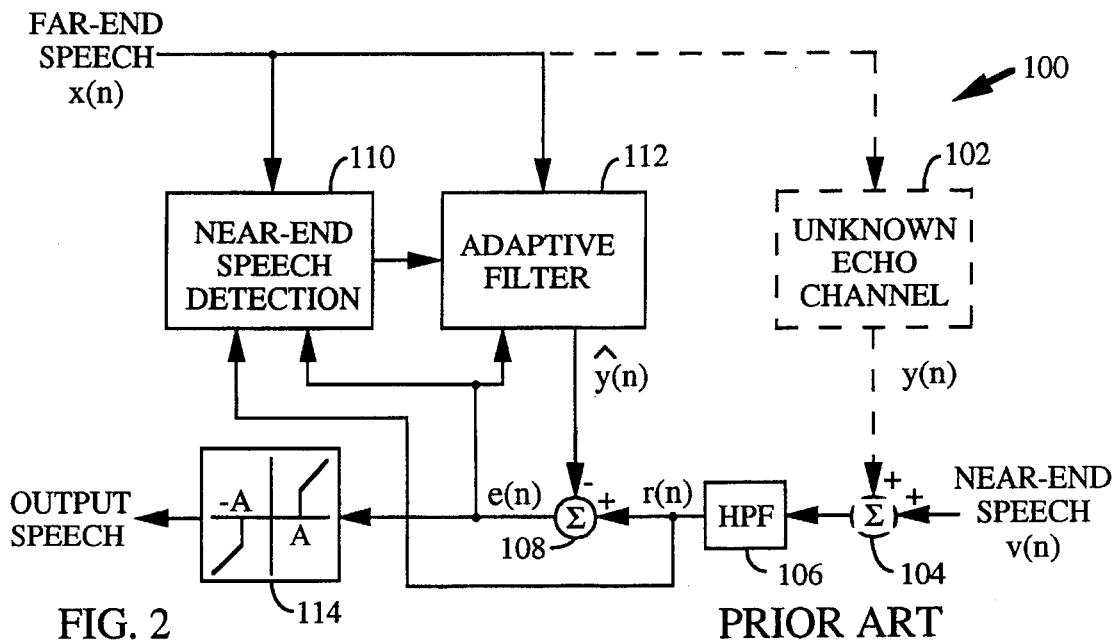
FIG. 2 is a block diagram of a conventional echo canceller.

In FIG. 2, the speech signal from the mobile station is labeled as the far-end speech $x(n)$, while the speech from the land side is labeled as near-end speech $v(n)$. The reflection of $x(n)$ off the hybrid is modeled as passing $x(n)$ through an unknown echo channel 102 to produce the echo signal $y(n)$, which is summed at summer 104 with the near-end speech signal $v(n)$. Although summer 104 is not an included element in the echo canceller itself, the physical effect of such a device is a parasitic result of the system. To remove low-frequency background noise, the sum of the echo signal $y(n)$ and the near-end speech signal $v(n)$ is high-pass filtered through filter 106 to produce signal $r(n)$. The signal $r(n)$ is provided as one input to summer 108 and to the near-end speech detection circuitry 110.

The other input of summer 108 (a subtract input) is coupled to the output of an adaptive transversal filter 112. Adaptive filter 112 receives the far-end speech signal $x(n)$ and a feedback of the echo residual signal $e(n)$ output from summer 108. In cancelling the echo, adaptive filter 112 continually tracks the impulse response of the echo path, and subtracts an echo replica $\hat{y}(n)$ from the output of filter 106 in summer 108. Adaptive filter 112 also receives a control signal from circuitry 110 so as to freeze the filter adaptation process when near-end speech is detected.

The echo residual signal $e(n)$ is also output to circuitry 110 and center-clipping echo supressor 114. The output of suppressor 114 is provided as the cancelled echo signal when echo cancellation is in operation.

Figure 3:
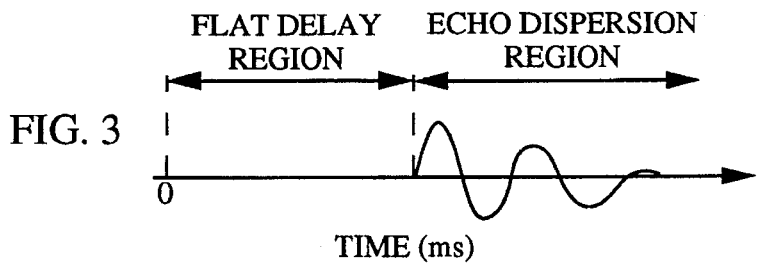
FIG. 3 is a graph illustrating the regions in an echo channel impulse response.

The echo path impulse response can be decomposed into two sections, the flat delay region and the echo dispersion, as is shown in the graph of FIG. 3. The flat delay region, where the response is close to zero, is caused by the round-trip delay for the far-end speech to reflect off the hybrid and return to the echo canceller. The echo dispersion region, where the response is significant, is the echo response caused by the reflection off the hybrid.

If the echo channel estimate generated by adaptive filter exactly matches the true echo channel, the echo is completely cancelled. However, the filter normally cannot precisely replicate the channel, causing some residual echo. Echo suppressor 114 eliminates the residual echo by passing the signal through a nonlinear function that sets to zero any signal portion that falls below a threshold A and passing unchanged any signal segment that lies above the threshold A. Synthesized noise can be used to replace signal sections that were set to zero by the center-clipping to prevent the channel from sounding "dead".

As mentioned previously, although this approach is satisfactory for analog signals, this residual echo processing causes a problem in digital telephony, where vocoders are used to compress speech for transmission. Since vocoders are especially sensitive to nonlinear effects, center-clipping causes a degradation in voice quality while the noise replacement causes a perceptible variation in noise characteristics.

Figure 4:
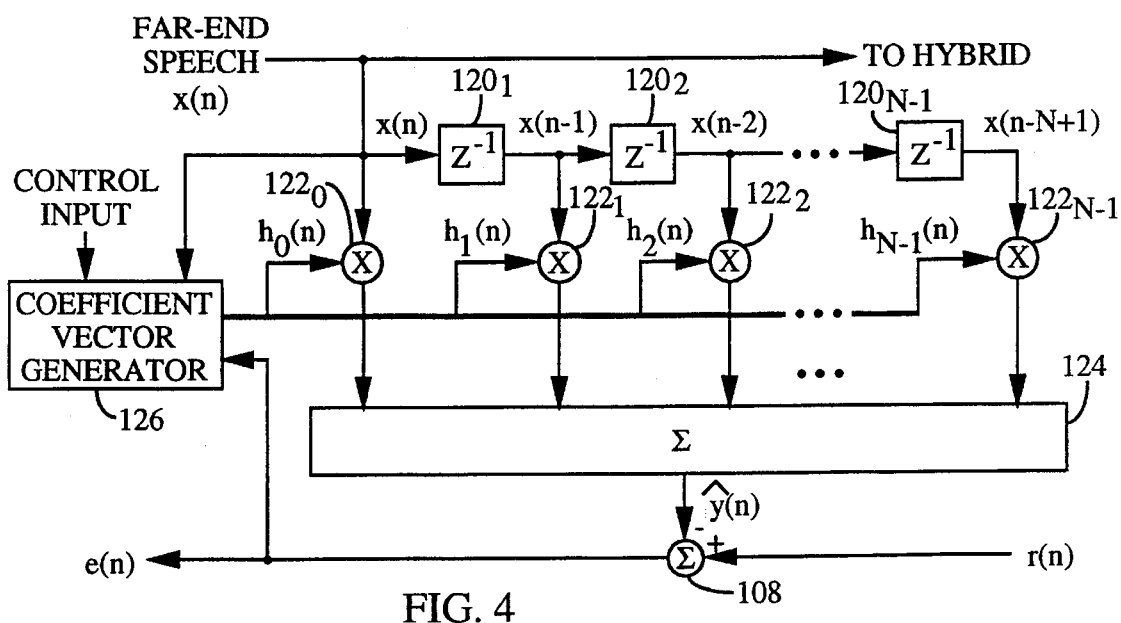
FIG. 4 is a block diagram of a transversal adaptive filter.

FIG. 4 illustrates in further detail the structure of adaptive filter 112 of FIG. 2. The notations in FIG. 4 are defined as follows:

N:The filter order;

$x(n)$:The sample of far-end speech at time n;

$h_k(n)$:The $k^{th}$ filter tap at time n;

$r(n)$:The echo sample at time n;

ŷ(n): The estimated echo at time n; and e(n): The echo residual at time n.

Adaptive filter 112 is comprised of a plurality of tapped delay elements $120_1$–$120_{N-1}$, a plurality of multipliers $1220_0$–$122_{N-1}$, summer 124 and coefficient generator 126. An input far-end speech sample x(n) is input to both of delay element $120_1$ and multiplier $1220_0$. As the next samples come into filter 112 the older samples are shifted through delay elements $120_2$–$120_{N-1}$, where they are also output to a respective one of multipliers $122_1$–$122_{N-1}$.

Coefficient generator 126 receives the echo residual signal e(n) output from summer 108 (FIG. 2) and generates a set of coefficients $h_0(n)$–$h_{N-1}(n)$. These filter coefficient values $h_0(n)$–$h_{N-1}(n)$ are respectively input to multipliers $1220_0$–$122_{N-1}$. The resultant output from each of multipliers $1220_0$–$122_{N-1}$ is provided to summer 124 where they are summed to provide the estimated echo signal ŷ(n). The estimated echo signal ŷ(n) is then provided to summer 108 (FIG. 2) where it is A subtracted from the echo signal r(n) to form the echo residual signal e(n). In the traditional echo canceller of FIG. 2, a control input is provided to generator 126 to enable coefficient updating when no near-end speech is detected by circuitry 110. When doubletalk or near-end speech only is detected by circuitry 110, the control input disables the updating of the filter coefficients.

The algorithm implemented in coefficient generator 126 for adapting the filter tap coefficients to track the echo path response is the normalized least-mean-square (NLMS) adaptation algorithm. Introducing for this algorithm the vectors:

$$\vec{x}(n)=[x(n)\ x(n-1)\ x(n-2)\ \ldots\ x(n-N+1)] \quad (1)$$

$$\vec{h}(n)=[h_0(n)\ h_1(n)\ h_2(n)\ \ldots\ h_{N-1}(n)] \quad (2)$$

the vector inner product between h(n) and x(n) is defined as:

$$<\vec{h}(n)\vec{x}(n)> = \sum_{i=0}^{N-1} h_i(n)x(n-i). \quad (3)$$

The adaptation algorithm is stated as:

$$\vec{h}(n+1) = \vec{h}(n) + \mu \frac{1}{(E_{xx}(n))} e(n)\vec{x}(n) \quad (4)$$

where:

$\vec{h}(n)$ is the tap coefficient vector, $\vec{x}(n)$ is the reference signal input vector, e(n) is the echo residual signal;

μ is the step size; and $E_{xx}(n)$ is an energy estimate computed as the sum of the squares of the N most recent samples where:

$$E_{xx}(n) = \sum_{i=0}^{N-1} [x(n-i)]^2 \quad (5)$$

The main advantages of this algorithm (4) are that it has smaller computation requirements than other adaptive algorithms, and its stability properties are well-understood. Convergence can be guaranteed by an appropriate choice of step size (0<μ<2) with μ=1 providing the fastest convergence. Smaller step sizes provide a greater degree of cancellation in the steady-state at the expense of convergence speed.

It should be noted that the near-end talker speech signal v(n) is not included in the echo residual signal e(n) because adaptive filter 112 is disabled by near-end speech detection circuitry 110 when speech from the near-end talker is detected.

In addition to providing the enable signal to filter 112, circuitry 110 may also generate and provide the value of $E_{xx}(n)$ to filter 112 in the control input. Furthermore the value of μ is typically fixed in generator 126 or a value provided from circuitry 110 in the control input.

The most difficult design problem in echo cancellation is the detection and handling of doubletalk, i.e., when both parties speak simultaneously. As opposed to a voice-activated switch (VOX) that allows only simplex communication, an echo canceller preserves duplex communication and must continue to cancel the far-end talker echo while the near-end speaker is talking. To prevent the filter coefficients from being corrupted by the near-end speech, the filter taps must be frozen to prevent divergence from the transfer characteristics of the actual echo channel.

Referring back to FIG. 2, near-end speech detection circuitry 110 may use energy measurements of x(n), r(n), and e(n) to determine when near-end speech is occurring. A classical doubletalk detection method compares short-term energy averages of x(n) and r(n) using the knowledge that the echo path loss across the hybrid is about 6 dB. If the hybrid loss drops below 6 dB, near-end speech is declared. However, experimental studies have revealed that this method lacks sensitivity. The large dynamic range of the near-end speech v(n) causes this method to miss detection occasionally, causing the filter coefficients to be corrupted.

Another popular doubletalk detection method examines the short-term echo return loss enhancement (ERLE), which is defined as:

$$\text{ERLE (dB)} = 10\ \log(\sigma_y^2/\sigma_e^2), \quad (6)$$

where $\sigma_y^2$ is the variance of y(n), $\sigma_e^2$ is the variance of e(n), and these variances are approximated using the short-term energy averages:

$$\hat{\sigma}_y^2 = \sum_{i=0}^{N-1} [y(n-i)]^2; \text{ and} \quad (7)$$

$$\hat{\sigma}_e^2 = \sum_{i=0}^{N-1} [e(n-i)]^2 \quad (8)$$

The ERLE represents the amount of energy that is removed from the echo after it is passed through the echo canceller. This doubletalk detection method compares short-term energy estimates of r(n) and e(n), and declares doubletalk if the short-term ERLE drops below some predetermined threshold such as 6 dB. Although this method provides greater sensitivity, it incurs a slight delay before detecting the onset of near-end speech, causing the echo channel estimate to be slightly corrupted before adaptation is frozen. This detriment necessitates the use of an additional technique to remove the residual echo. It is therefore desirable to find an improved method of preserving the echo channel estimate in doubletalk such as the present invention provides.

In using either of these energy comparison methods to detect doubletalk, high levels of background noise, particularly in the cellular call environment, can create difficulties in accurate doubletalk detection. It is therefore desirable to utilize an improved method for detecting doubletalk in high noise background noise level environments as the present invention provides.

Figure 5:
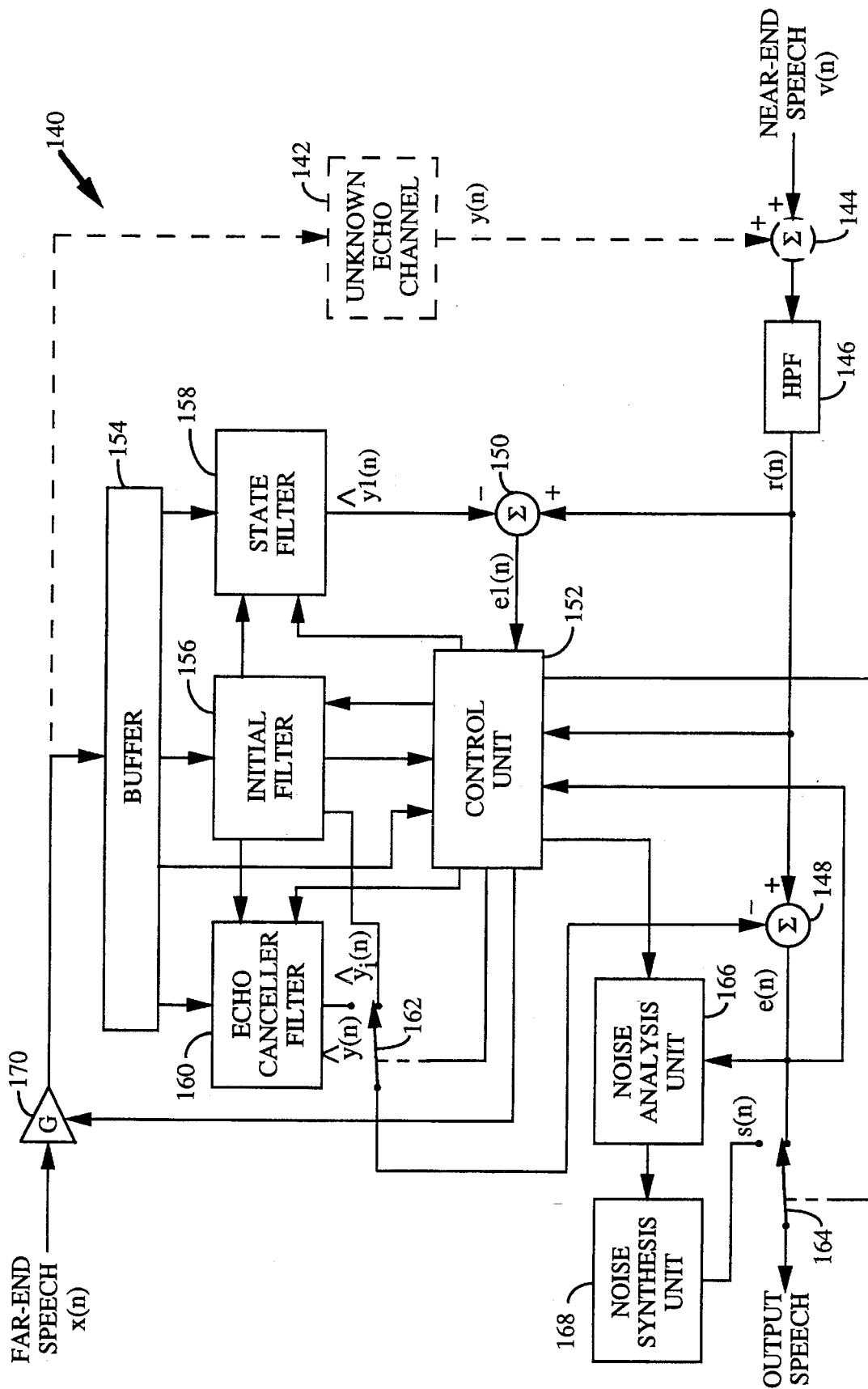
FIG. 5 is a block diagram of the echo canceller of the present invention.

Referring now to FIG. 5, a block diagram of an exemplary embodiment of network echo canceller (NEC) 140 of the present invention is illustrated. In an exemplary implementation, NEC 140 is configured in digital signal processor form, such as a model of the TMS 320C3X series digital signal processors manufactured by Texas Instruments of Dallas Texas. It should be understood that other digital signal processors may be programmed to function in accordance with the teachings herein. Alternatively, other implementations of NEC 140 may be configured from discrete processors or in application specific integrated circuit (ASIC) form.

It should be understood that in the exemplary embodiment, NEC 140 is in essence a state machine that has defined functions for each of the different states of operation. The states in which NEC 140 operates is silence, far-end speech, near-end speech, doubletalk, and hangover. Further details on the operation of NEC 140 is described later herein.

In FIG. 5, as was for FIG. 2, the speech signal from the mobile station is labeled as the far-end speech x(n), while the speech from the land side is labeled as near-end speech v(n). The reflection of x(n) off the hybrid is modeled as passing x(n) through an unknown echo channel 142 to produce the echo signal y(n), which is summed at summer 144 with the near-end speech signal v(n). Although summer 144 is not an included element in the echo canceller itself, the physical effect of such a device is a parasitic result of the system. To remove low-frequency background noise, the sum of the echo signal y(n) and the near-end speech signal v(n) is high-pass filtered through filter 146 to produce signal r(n). The signal r(n) is provided as one input to each of summers 148 and 150, and control unit 152.

The input far-end speech x(n) is stored in buffer 154 for input to a set of transversal adaptive filters (initial filter 156, state filter 158 and echo canceller filter 160), and control unit 152. In the exemplary embodiment initial filter 156 has 448 filter coefficients or taps while state filter 158 and echo canceller filter 160 each have 256 taps.

During the initial operation of NEC 140, the speech samples x(n) are provided to initial filter 156 for initial echo cancellation and echo delay adjustment under the control of control unit 152. During this period of initial operation, state filter 158 and echo canceller filter 160 are disabled by control unit 152. The initial echo cancellation output signal ŷ(n) from initial filter 156 is provided through filter switch 162 to summer 148. At summer 148 the signal ŷî(n) is subtracted from the signal r(n) to produce an initial estimate of the echo residual signal e(n). Filter switch 162, under the control of control unit 152, selects between the output of initial filter 156 and echo canceller filter 160 for input to summer 148.

As mentioned previously, an echo delay adjustment process is undertaken during the period of initial operation of NEC 140. In this process the filter tap coefficients or taps of initial filter 156 are provided to control unit 152 for a determination of the taps of largest value. This process is used to distinguish the flat delay region from the echo dispersion region of the signal.

Upon completion of the echo delay adjustment process, 256 taps from initial filter 156 are copied into the taps of state filter 158 and echo canceller filter 160 as described later in further detail. The result of the echo delay adjustment process ensures that adaptive filtering occurs on the samples x(n) which coincide with the echo dispersion region of the signal r(n). After this initial operation, state filter 158 and echo canceller filter 160 are enabled and initially use the taps provided by filter 156. All future adaptation is based upon generated taps.

During the period of normal operation of NEC 140, the signal ŷî(n) is output from state filter 158 to one input of summer 150 where it is subtracted from the signal r(n). The resultant output from summer 150 is the signal e1(n) which is input to control unit 152. The output of echo canceller filter 160, the echo replica signal ŷ(n), is provided through filter switch 162 to one input of summer 148 where it is subtracted from the signal r(n). The resultant echo residual signal e(n) output from summer 148 is fed back as an input to control unit 152. The echo residual signal e(n) as output from summer 148 may be provided directly as the output of the NEC 140 or through additional processing elements. As discussed later in further detail, control unit 152 also provides control over the adaptation of state filter 158 and echo canceller filter 160.

In the present invention a noise analysis/synthesis feature may be provided in the output of NEC 140. This feature is supported by output switch 164, noise analysis unit 166 and noise synthesis unit 168. Output switch 164 and noise analysis unit 166 both receive the output signal e(n) from summer 148. Noise analysis unit 166, under the control of control unit 152, analyzes the signal e(n) and provides an analysis output to noise synthesis unit 168. Noise synthesis trait 168 generates a synthesized noise signal s(n) based upon the analyzed characteristics of the signal e(n). The output of noise synthesis unit 168 is then provided to output switch 164. Through output switch 164, which is under the control of control unit 152, the output of NEC 140 is provided either as the signal e(n) directly from summer 148 or the synthesized noise signal s(n) from noise synthesis unit 168.

The majority of a typical phone conversation is spent in singletalk mode, when only one person is speaking at any time. When only the far-end speaker is talking, NEC 140 uses the noise analysis/synthesis feature to completely reject the echo by replacing the echo residual signal e(n) with a synthesized noise signal s(n). To prevent the far-end speaker from detecting any change in signal characteristics, the noise is synthesized to match the power and spectral characteristics of the actual background noise during the most recent period of silence using linear predictive coding (LPC) techniques. This noise synthesis method, discussed in further detail later herein, effectively eliminates singletalk as a design consideration so as to permit the optimization of NEC 140 for doubletalk. Further details on the noise analysis/synthesis feature is described later.

As an additional feature of the present invention, a gain stage may also be provided as illustrated in the exemplary embodiment of FIG. 5. In implementing this feature, variable gain element 170 is provided at the input of far-end speech signal x(n) to NEC 140. The input far-end speech signal x(n) is provided through variable gain stage 170 to buffer 154 and unknown echo channel 142. Control unit 152 provides in combination with variable gain stage 170 an automatic gain control feature to limit signals which would be otherwise affected in a nonlinear manner by unknown echo channel 142. Control unit 152 and variable gain stage 170 also serve to decrease the convergence time for the filter adaptation process. Again further details on this feature are described later.

As illustrated in the exemplary implementation of the present invention, two independently-adapting filters, filters 158 and 160, track the unknown echo channel. While filter 160 performs the actual echo cancellation, filter 158 is used by the control unit 152 to determine which of several states NEC 140 should be operating in. For this reason, filters 158 and 160 are respectively referred to as the state filter and the echo canceller filter. The advantage of this two-filter approach is that the filter coefficients of echo canceller filter 160, which model unknown echo channel 142, can be preserved more effectively without risk of degradation from near-end speech. By preserving the echo channel characteristics closely, the design of the present invention obviates the need for center-clipping.

The control algorithm embodied within control unit 152, which monitors the performance of both filters 158 and 160, is optimized to preserve the estimated echo channel characteristics in doubletalk. Control unit 152 switches on and off the adaptation of filters 158 and 160 at the proper times, adjusts the step sizes of both filters, and adjusts gain unit 170 on x(n) to permit fast initial adaptation.

Figure 6:
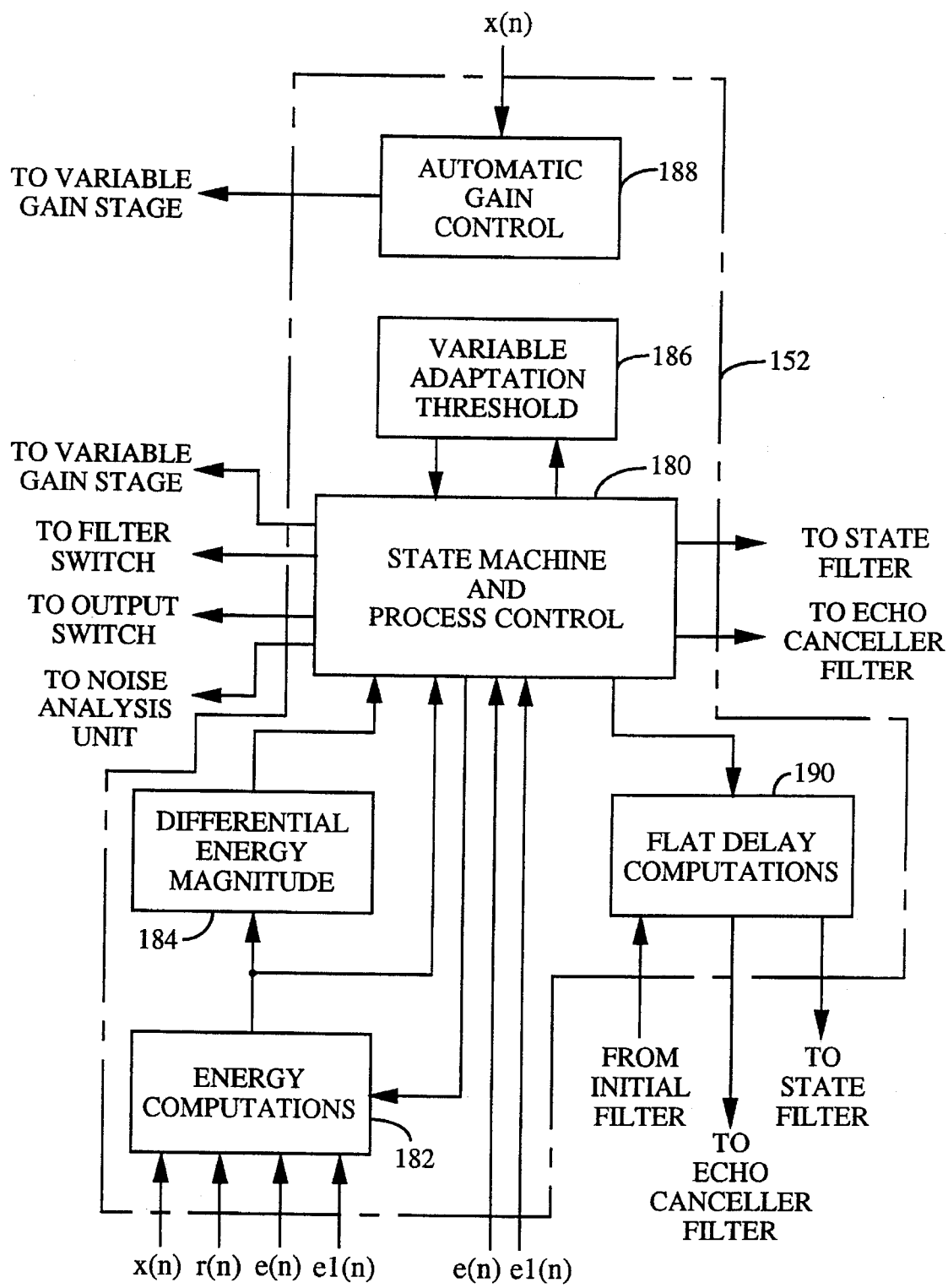
FIG. 6 is a block diagram illustrating further details of the control unit of FIG. 5.

FIG. 6 illustrates (in functional block diagram form) further details of control unit 152 of FIG. 5. In FIG. 6, control unit 152 is comprised of state machine and process control unit 180, energy computation unit 182, differential energy magnitude unit 184, variable adaptation threshold unit 186, automatic gain control unit 188 and flat delay computation unit 190.

Figure 7:
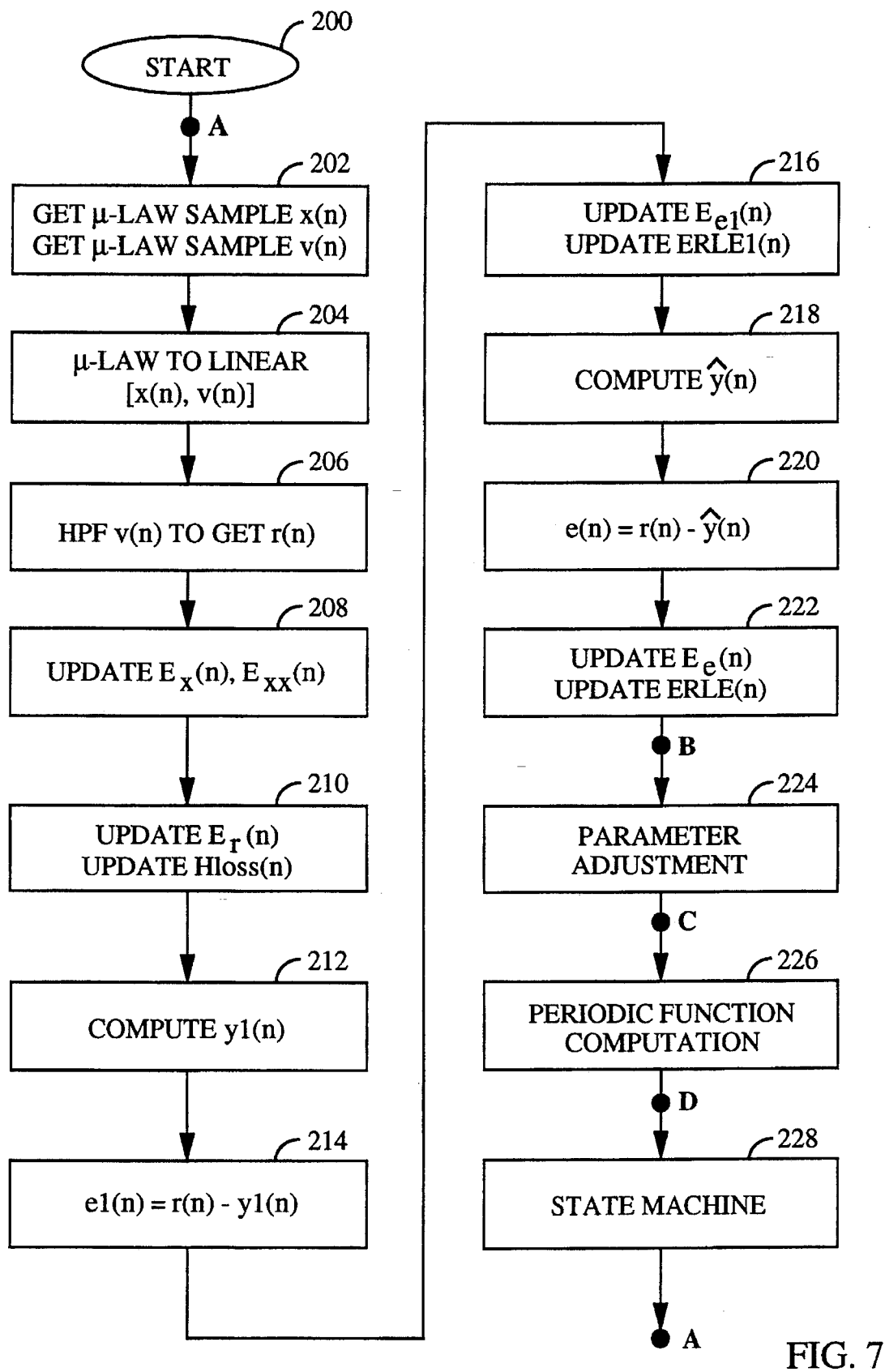
FIG. 7 is a flow diagram of the sample data processing for echo cancelling.
Figure 14A:
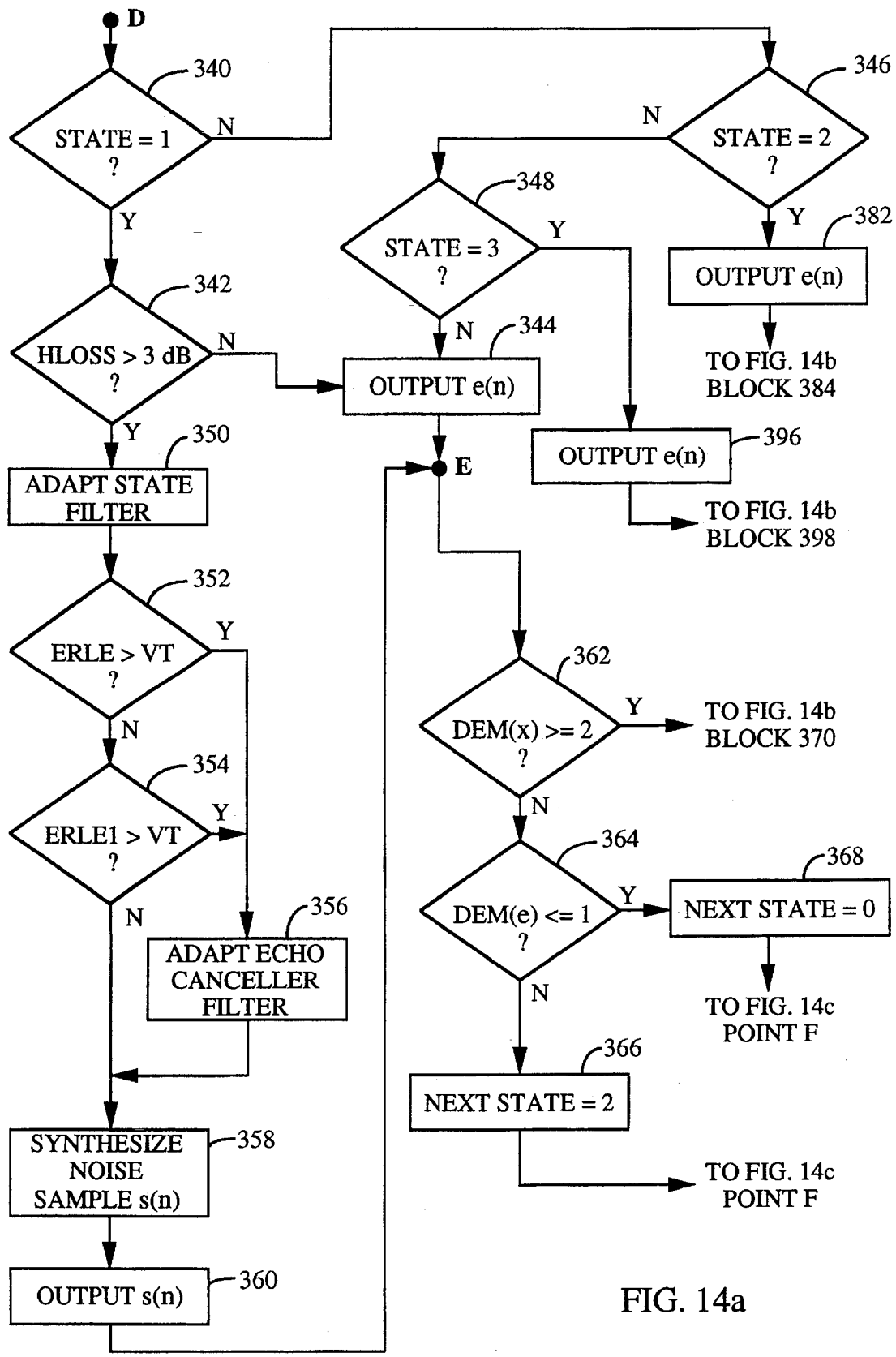
FIGS. 14a–14c are flow diagrams illustrating the steps involved in the state machine step of FIG. 7.
Figure 14B:
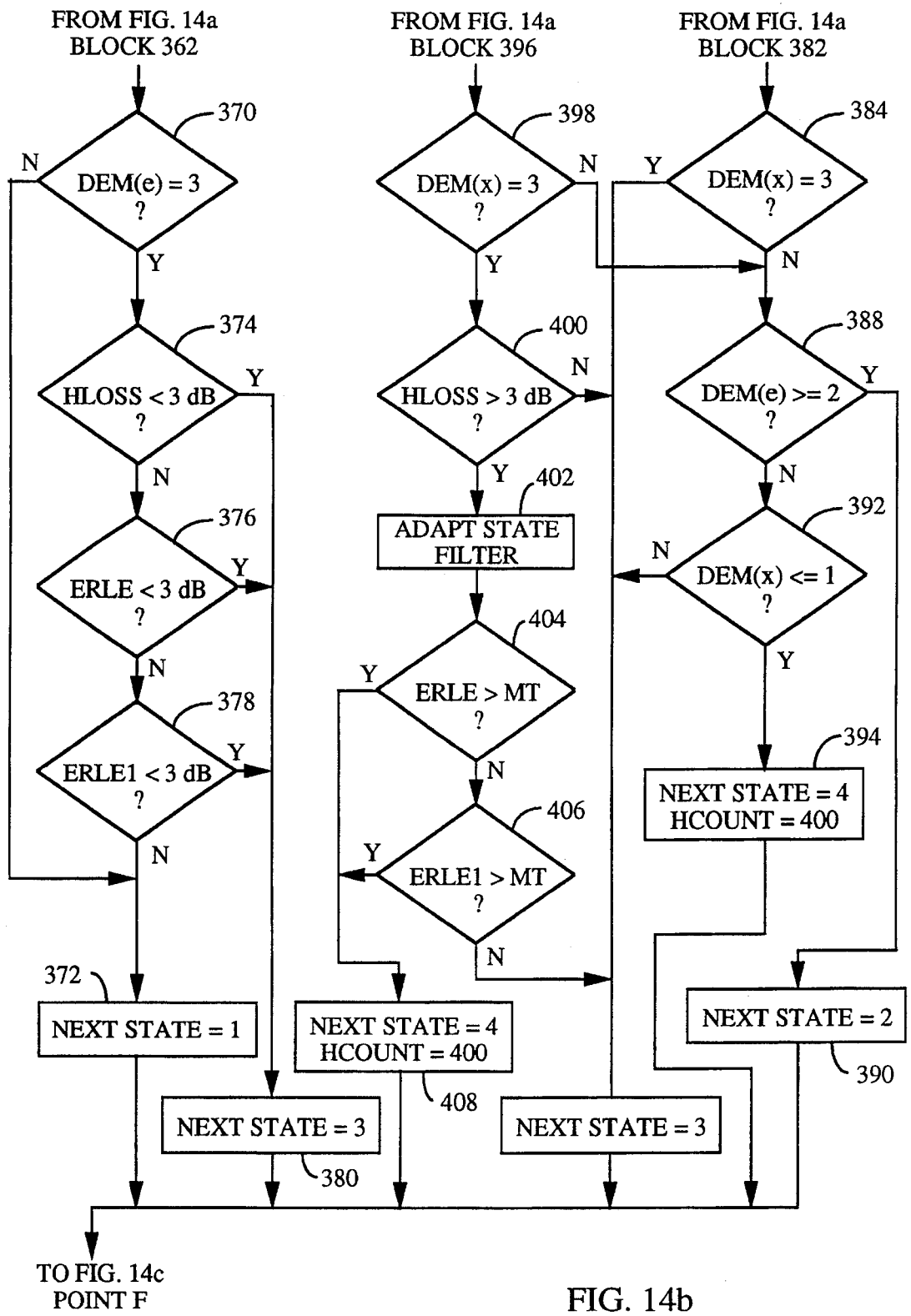
Figure 14C:
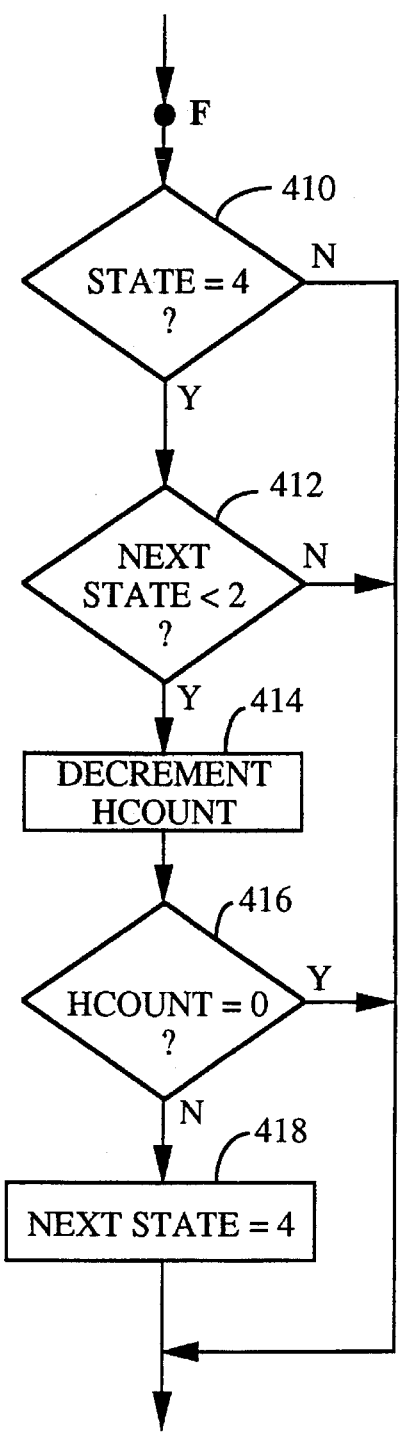

State machine 180 performs the overall state machine function as illustrated with respect to FIGS. 14a–14c, and various overall process control such as illustrated with respect to FIG. 7. State machine 180 provides control over initial filter 156 and flat delay computation unit 190 during the initial operation of NEC 140. State machine 180 provides control to state filter 158 and echo canceller filter 160 with respect to initial settings, adaptation control, and step size control. State machine 180 also provides control over noise analysis unit 166 and switches 162 and 164. State machine 180 also enables variable adaptation threshold unit 186 for state machine adaptation control of echo canceller filter 160. State machine 180 also receives the signals e(n) from summer 148 and e1(n) from summer 150 for respectively providing to echo canceller filter 160 and state filter 158. In the alternative the signals e1(n) and e(n) may be provided directly to state filter 158 and echo canceller filter 160.

Energy computation unit 182 receives the sample values for x(n) from circular buffer 154, r(n) from HPF 146, e(n) from summer 148, and e1(n) from summer 150; and computes various values as discussed later herein for providing to differential energy magnitude unit 184 and state machine 180. Differential energy magnitude unit 184 uses energy values computed in energy computation unit 182 for comparison with threshold levels so as to determine whether near-end speech and/or far-end speech is present. The result of this determination is provided to state machine 180.

Energy computation unit 182 computes energy estimates at each step for filters 158 and 160. These energy estimates are computed as the sum of squares of the most recent samples. The two energy measurements, Ex(n) and Exx(n), on signal x(n) at time n are computed respectively over 128 and 256 samples and can be expressed according to the following equations:

$$E_x(n) = \sum_{i=0}^{127} [x(n-i)]^2; \text{ and} \qquad (9)$$

$$E_{xx}(n) = \sum_{i=0}^{255} [x(n-i)]^2. \qquad (10)$$

Similarly, energy computation unit 182 computes the energy estimates Er (n), Ee (n) and $E_{e1}(n)$ at time n for the respective signals r(n), e(n) and $e_1(n)$ according to the following equations:

$$Er(n) = \sum_{i=0}^{127} [r(n-i)]^2; \qquad (11)$$

$$Ee(n) = \sum_{i=0}^{127} [e(n-i)]^2; \text{ and} \qquad (12)$$

$$E_{e1}(n) = \sum_{i=0}^{127} [e1(n-i)]^2. \qquad (13)$$

Energy computation unit 182 also computes the hybrid loss at time n, Hloss(n), according to the following equation:

$$Hloss(n)(dB) = 10\log_{10}[E_x(n)/E_r(n)]. \qquad (14)$$

The echo return loss enhancement (ERLE) of echo canceller filter 160 is computed by energy computation unit 182 according to the following equation:

$$ERLE(n)(dB) = 10\log_{10}[E_r(n)/E_e(n)] \qquad (15)$$

with the echo return loss enhancement of state filter 158 (ERLE1) also being computed by energy computation unit 182 according to the following equation:

$$ERLE1(n)(dS) = 10\log_{10}[E_r(n)/E_{e1}(n)]. \qquad (16)$$

To avoid nordinearities in the echo signal caused by the echo channel, it is desirable to limit the received value of sample x(n) to a value less than a preset threshold near the maximum. Automatic gain control unit 188 in combination with variable gain stage 170 achieve this result. Automatic gain control unit 188, which receives the samples x(n) from the circular buffer, provides a gain control signal to variable gain element 170 so as to limit the sample values when they are excessively large.

Flat delay computation unit 190 under the control of state machine 180 at the initial operation of NEC 140 computes the flat delay from the initial filter. Flat delay computation unit 190 then provides circular buffer offset information to state filter 158 and echo canceller 160 to account for the flat delay period for the call.

In the exemplary embodiment of the network echo canceller of the present invention, a three-pronged approach is used to solve the doubletalk detection/handling problems. Accordingly the present invention uses (1) two independently-adapting filters with different step-sizes; (2) a variable threshold to switch filter adaptation on and off; and (3) a differential energy algorithm for speech detection.

NEC 140 uses two independently-adapting NLMS adaptive filters. Unlike other two-filter approaches, the NEC 140 does not switch back and forth between using filters 158 and 160 for the echo cancellation, nor does it exchange tap information between the two filters in the steady state. Both of these previously known techniques cause transients that lead to undesired "pops" in the output of the echo canceller. In the present invention echo canceller filter 160 always performs the actual echo cancellation while state filter 158 is used by the control algorithm embedded within state machine 180 to distinguish different canceller states. This novel dual-filter approach permits the use of a conservative adaptation strategy for echo canceller filter 160. If the control algorithm is "unsure" of which state the canceller should be operating in, it turns off the adaptation of echo canceller filter 160 while state filter 158 continues to adapt. State machine 180 uses the statistics gleaned from state filter 158 to aid in state-determination. The step sizes of the adaptive filters are adjusted so that echo canceller filter 160 obtains a high ERLE in the steady state, while state filter 158 responds quickly to any changes in the echo channel response. By allowing the two filters 158 and 160 to simultaneously adapt in the manner just mentioned, overall performance of the echo canceller is enhanced.

State filter 158 and echo canceller filter 160, along with initial filter 156 are each constructed in a manner as was disclosed with reference to FIG. 4. State filter 158 and echo canceller filter 160 each contain 256 taps to account for a 32 ms echo dispersion duration at an 8-kHz sampling rate. It should be understood that for state filter 158 and echo canceller filter 160, a greater or lesser number of taps may be used depending upon the echo dispersion duration and sampling rate. Sample buffer 154 contains 512 far-end speech samples to account for a 64 ms time period for the flat delay and echo dispersion for a call made across the continental United States. To handle the different values of flat delay encountered in individual phone calls, the network echo canceller of the present invention automatically determines the flat delay and shifts the filter taps to maximize the number of taps operating on the echo dispersion region. The echo canceller of the present invention therefore handles echo responses ranging from 0 to 32 ms with no shift, up to 32 to 64 ms with the maximum delay shift. It should be understood that as is well known in art with respect to digital signal processors, and processing techniques associated therewith, that initial filter 156 may be used to form filters 158 and 160. Upon completion of the initial processing initial filter 156 may be "broken" into the two filters 158 and 160 with independent coefficient generators. Further details on the initial feature are discussed later herein.

To preserve the filter coefficients of echo canceller filter 160 at the onset of doubletalk, the NEC 140 uses a variable adaptation threshold (denoted VT) to switch on and off the adaptation of echo canceller filter 160. The variable adaptation threshold (VT) is computed by variable adaptation threshold unit 186 and provided to state machine 180. The control algorithm permits echo canceller filter 160 to adapt if either of state filter 158 or echo canceller filter 160 has an ERLE greater than VT. Referring back to FIG. 4, the control input provided to generator 126 includes an enable signal from control unit 152 which permits coefficient vector generator 126 to update the filter coefficients for filter adaptation. In the event that the ERLE of both filters is less than VT, state machine 180 disables coefficient vector generator 126 from providing updated coefficients. In this case coefficient vector generator 126 outputs the existing coefficients until adaptation is enabled once again. The control input also provides other parameters to coefficient vector generator 126 such as the values of $\mu$, Exx(n) and e(n) of Equation (4).

In FIG. 6, the ERLE for state filter 158 is computed in energy computation unit 182 according to Equation (6) using the values of r(n) and e1(n). Similarly the computation is done in energy computation unit 182 for echo canceller filter 160 with the values of r(n) and e(n). In variable adaptation threshold unit 186, the VT is initialized by state machine 180 to an initial minimum threshold, which in the exemplary embodiment is 6 dB. The threshold processing in variable adaptation threshold unit 186 can be described by the following C-code:

```
if (ERLE > VT + 6 dB) {
    VT = MAX[VT, (ERLE - 6 dB)];
} else if (ERLE < MT - 3 dB) {
    VT = MT;
}
```

As the ERLE rises past (VT+6 dB), the adaptation threshold also rises, remaining 6 dB behind the peak ERLE. This 6 dB margin accounts for the variability of the ERLE. State machine 180 permits echo canceller filter 160 to continue to adapt if the ERLE of either of filters 158 and 160 is within 6 dB of the last ERLE peak. If the ERLE drops 3 dB below the minimum threshold, the adaptation threshold is reset to the minimum threshold. The advantage of this approach is that the adaptation of echo canceller filter 160 is immediately halted right at the onset of doubletalk. For example, suppose the far-end speaker is the only one talking and the last ERLE peak is at 34 dB. Once the near-end speaker starts to talk, the ERLE falls and the filter adaptation is stopped when the ERLE hits 28 dB. Classical near-end speech detectors will not suspend adaptation until the ERLE falls below about 6 dB, which permits the echo channel estimate to be slightly corrupted. Therefore, by preserving the echo channel characteristics more closely, the present invention achieves greater echo rejection in doubletalk while avoiding the voice-quality degradation associated with center-clippers used in traditional echo cancellers.

In the exemplary embodiment of the present invention it is preferred that the ERLE of both filters 158 and 160 drop below VT before adaptation of filter 160 is halted. This characteristic of the control algorithm helps distinguish the onset of doubletalk from the normal variability of either ERLE measurement, because the ERLE of both filters will drop immediately at the onset of doubletalk.

A further aspect of the present invention is that as filters 158 and 160 obtain convergence, the value of the minimum threshold for VT is increased from the initial setting. As the minimum threshold for VT increases, a higher ERLE is necessary before echo canceller filter 160 is adapted.

To prevent large background noise levels from interfering with state determination, the echo canceller of the present invention uses a differential energy algorithm on the signals x(n) and e(n). This algorithm, embedded within differential energy magnitude unit 184 and state machine 180, described in further detail later herein, continually monitors the background noise level and compares it with the signal energy to determine if the speaker is talking. Differential energy magnitude unit 184 in the exemplary embodiment computes three thresholds $T_1(B_i)$, $T_2(B_i)$, and $T_3(B_i)$, which are functions of the background noise level $B_i$. If the signal energy of the signal x(n) exceeds all three thresholds, the speaker is determined to be talking. If the signal energy exceeds T1 and T2 but not T3, the speaker is determined to be probably uttering an unvoiced sound, such as the "sp" sound in the word "speed." If the signal energy is smaller than all three thresholds, the speaker is determined to be not talking.

An exemplary overall flow diagram of sample data processing in the echo canceller of the present invention is shown below in FIG. 7. The algorithm under the control of state machine 180 initially starts, block 200, and then first obtains the μ-law samples of x(n) and v(n), block 202, which are then converted to their linear values, block 204. The v(n) sample is then passed through the high-pass filter (HPF) to obtain sample r(n), block 206. The HPF, filter 146 of FIG. 5 which eliminates residual DC and low frequency noise, is a digital filter constructed using well known digital filter techniques. The HPF is typically configured as a third order elliptic filter with the characteristics of a stopband of a 120 Hz cutoff with 37 dB rejection, and a passband of a 250 Hz cutoff with 0.7 dB ripple. The HPF is typically implemented as a cascade of a first order and second order direct-form realizations with the coefficients indicated in Table I as follows:

TABLE I

| A(1) | A(2) | B(0) | B(1) | B(2) |
|---|---|---|---|---|
| −.645941 | 0 | .822970 | −.822970 | 0 |
| −1.885649 | .924631 | 1.034521 | −2.061873 | 1.034461 |

Next, the energy averages Ex(n) and Exx(n) are updated for the signal sample x(n), block 208. The energy average Er(n) is then updated for the signal sample r(n) along with the computing of the energy loss Moss(n) on the hybrid, block 210.

The output of adaptive filter 158 (FIG. 5), the value y1(n) is computed, block 212, with the echo residual e1(n) then being determined, block 214. The ERLE1 and energy average $E_{e1}$ for filter 158 are then updated, block 216. Similarly the output of adaptive filter 160 (FIG. 5), the value y(n) is computed, block 218, with the echo residual e(n) then being determined, block 220. The ERLE and energy average $E_e$ for filter 160 are then updated, block 222. It should be understood that certain of the steps set forth in blocks 208–222 may be performed in various other orders as dictated by the values required for further steps. Furthermore certain steps may be performed in parallel such as steps 212–216 and 218–222. Therefore the order discussed herein with reference to FIG. 7 is merely an exemplary order of processing steps.

Figure 8:
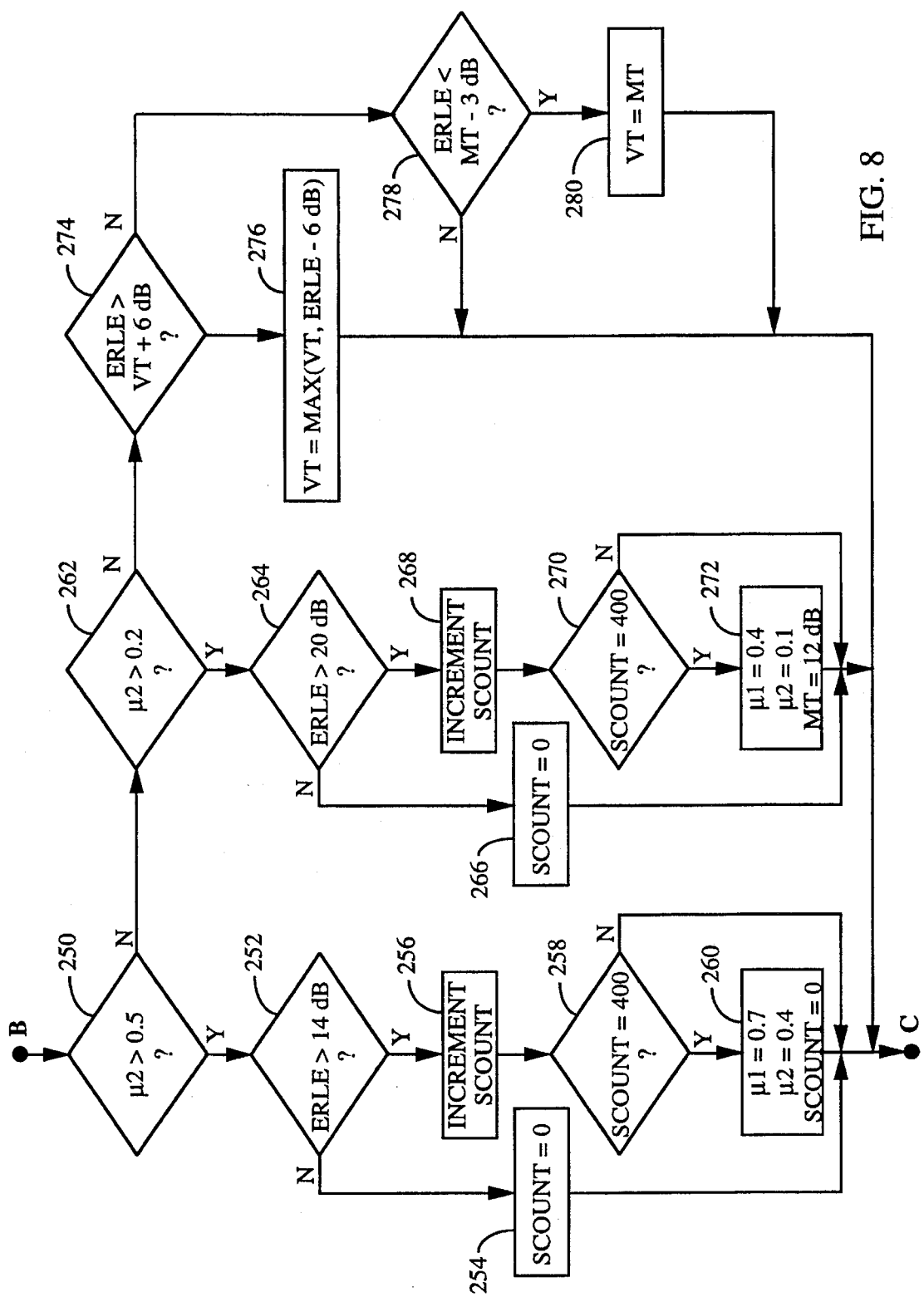
FIG. 8 is a flow diagram of the steps involved in the parameter adjustment step of FIG. 7.

Upon completion of the previous steps a parameter adjustment step is performed, block 224, with this step described in further detail with respect to FIG. 8. Upon completion of the parameter adjustment step a periodic function step is performed, block 226, with this step described in further detail with respect to FIG. 9. Upon completion of the periodic function step a state machine operation step is performed, block 228, with this step described in further detail with respect to FIGS. 14a–14c. Upon completion of the state machine operation step the process repeats with a return to point A in the flow diagram.

The flow diagram in FIG. 8 illustrates in further detail the parameter adjustment step of block 224 of FIG. 7. In the parameter adjustment step the filter step-size and variable threshold parameters are updated during the echo canceller operation.

Both state filter 158 and echo canceller filter 160 (FIG. 5) are initialized by state machine 180 at the start of operation by providing in the control input to the filter coefficient generator a step size of 1 (µ1=µ2=1). This initialization of the filters at this level permits a fast initial convergence. Upon reaching the parameter adjustment step an initial parameter adjustment algorithm is utilized. In this initial algorithm a determination is made as to whether the control element set value of µ2 for the echo canceller filter is greater than a fixed value of 0.5, block 250. If so, a determination is made as to whether the ERLE is greater than 14 dB, block 252. If the ERLE is not greater than 14 dB, such as at the beginning of obtaining convergence of the channel, a counter (Scount counter) value is set equal to zero (Scount=0), block 254, and the parameter adjustment step is completed for this sample with the subroutine exited at point C.

Should the ERLE be determined to be greater than 14 dB, the counter is incremented, block 256. A determination is then made as to whether the Scount value has been incremented to a count value of 400, block 258. If the Scount value is less than the count value of 400 the parameter adjustment step is completed for this sample with the subroutine exited at point C.

However, should the determination in block 258 result in the Scount value being found to be equal to the count value of 400, which corresponds to the ERLE being greater than 14 dB for 50 ms (consecutively), the step size (µ1) of the state filter is shifted to 0.7 and the step size (µ2) of the echo canceller filter is shifted to 0.4, block 260. Also in block 260 the Scount counter is reset to zero. The parameter adjustment step is then completed for this sample with the subroutine exited at point C.

If in block 250 the control element set value of µ2 for the echo canceller filter is determined to be not greater than a fixed value of 0.5, an intermediate algorithm is invoked. In this intermediate algorithm a determination is made as to whether the value for µ2 is greater than 0.2, block 262. If so, a determination is made as to whether the ERLE is greater than 20 dB, block 264. If the ERLE is not greater than 20 dB the Scount value is set equal to zero (Scount=0), block 266, and the parameter adjustment step is completed for this sample with the subroutine exited at point C.

Should the ERLE be determined to be greater than 20 dB, the counter is incremented, block 268. A determination is then made as to whether the counter value has been incremented to a count value of 400, block 270. If the counter value is less than the count value of 400 the parameter adjustment step is completed for this sample with the subroutine exited at point C.

However, should the determination in block 270 result in the Scount counter value being found to be equal to the count value of 400, which corresponds to the ERLE being greater than 20 dB for 50 ms, the value µ1 is shifted to 0.4, with the value µ2 shifted to 0.1, block 272. Further in block 272 the minimum threshold is increased from the initial minimum threshold value of 6 dB to 12 dB. The parameter adjustment step is then completed for this sample with the subroutine exited at point C.

It should be noted that "gearshifting" of the filters to smaller step sizes permits higher ERLE levels to be used. However, in the preferred embodiment a relationship of µ2<µ1 is maintained so that the echo canceller filter attains a high steady-state ERLE, and the state filter responds quickly to changes in the echo channel response.

After the echo canceller filter value of µ2 is set to equal 0.1, the variable adaptation threshold algorithm goes into effect to preserve the echo channel response more closely. The variable threshold algorithm implemented within variable adaptation threshold unit 186 is invoked when in block 262 the value of µ2 is determined to be less than 0.2. If the ERLE is determined to be 6 dB greater than the variable threshold (VT), which is initially set to the initial minimum threshold of 6 dB, block 274, the value of VT is modified in block 276. In block 276 VT is set to the greater of the previous value of VT or the value of the ERLE minus 6 dB. Once VT is set, the parameter adjustment step is then completed for this sample with the subroutine exited at point C.

However, if in block 274 the ERLE is determined not to be greater than VT plus 6 dB, a determination is made if the ERLE is less than the minimum threshold minus 3 dB, block 278. In block 278 the value of the minimum threshold MT is 12 dB as set in the intermediate algorithm. Should the ERLE be greater than the minimum threshold minus 3 dB the parameter adjustment step is then completed for this sample with the subroutine exited at point C. However should in block 278 the ERLE be determined not greater than the minimum threshold minus 3 dB, VT is set to the value of MT which is 12 dB, block 280. The parameter adjustment step is then completed for this sample with the subroutine exited at point C.

It should be noted that by increasing the minimum threshold the process becomes more selective as to when the echo canceller filter is adapted: a higher ERLE from either filter is required. The use of a higher minimum threshold results in a higher ERLE required to enter the hangover state from the doubletalk state, as discussed later with respect to the state machine processing in FIGS. 14a–14c.

To promote a fast transition into the steady state, even in the presence of large near-end background noise, the echo canceller of the present invention initially adjusts the input gain on x(n) to +3 dB (IGain=3 dB) during far-end speech. As shown in FIG. 5, state machine 180 provides control over variable gain stage 170. This initial 3 dB gain increases the size of the echo received at r(n) relative to the near-end noise (S/N ratio increases by 3 dB) which allows faster initial convergence. When the minimum threshold reaches 12 dB, block 272 of FIG. 7, state machine 180 restores IGain to its nominal value of 0 dB in 1.5 dB steps every 100 ms. Experimental studies have revealed that 1.5 dB gain changes are imperceptible to listeners. This gain adjustment is normally phased out within the first 500 ms of far-end speech.

A second gain adjustment on variable gain stage 170, under the control of automatic gain control unit 188, is made to automatically avoid clipping. The μ-law samples of x(n) that the echo canceller receives from the vocoder typically range between −8031 and +8031. When the samples x(n) that are sent toward the hybrid are near the maximum value of +8031, or −8031, the samples returning from the hybrid are nonlinearly related to the reference signal x(n). To solve this problem, the echo canceller of the present invention uses automatic gain control unit 188 to automatically control variable gain element 170 to attenuate the input samples by 1.5 dB (IGain=−1.5 dB) whenever the absolute value of sample x(n) is greater than a preset value near the maximum, for example a value of 7900. IGain is restored to 0 dB as soon as the canceller enters the silence state. This gain change, which is imperceptible to the near-end listener, does not normally come into effect in a typical conversation, but greatly improves the echo canceller operation when the far-end talker is shouting.

Figure 9:
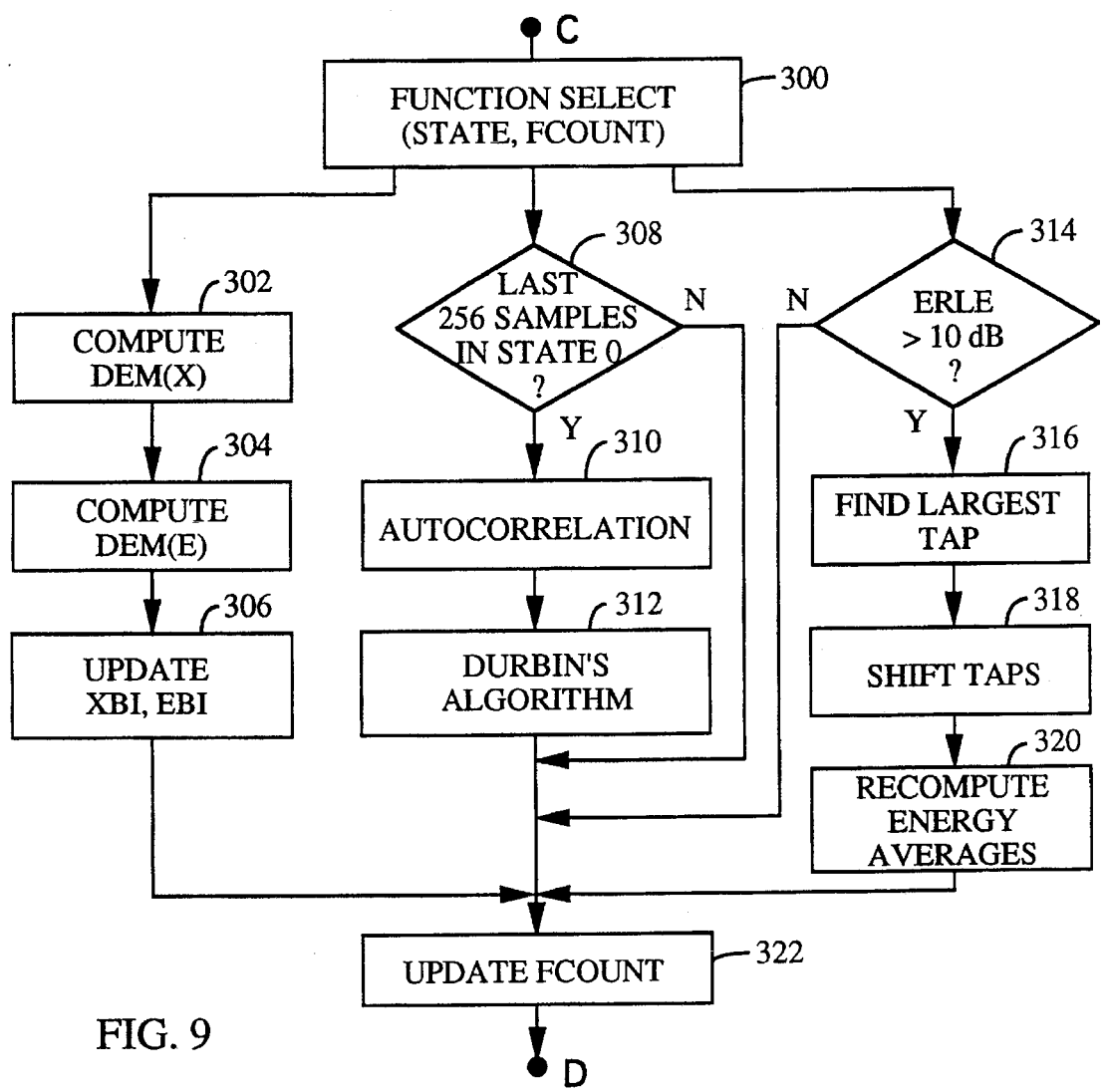
FIG. 9 is a flow diagram of the steps involved in the periodic function computation step of FIG. 7.

Referring back to FIG. 7, after the parameter adjustment step is completed the periodic function computation step is performed. FIG. 9 illustrates the three computations that are periodically performed in the periodic function computation step: (1) the differential energy magnitudes of signals x(n) and e(n), (2) the autocorrelation and Durbin recursion for noise analysis, and (3) the tap-shifting algorithm to account for varying echo delays.

In FIG. 9, the period function computation step starts in a function select step, block 300, which determines from the state of the state machine and a counter (Fcount) as to which computations need be performed. Regardless of state, every 128 samples the differential energy magnitudes of signals x(n) and e(n) is computed in differential energy magnitude unit 184 (FIG. 6).

The differential energy magnitude of the signal x, denoted DEM(x), is used to determine whether the far-end speaker is speaking. The DEM(x) is in the preferred embodiment provided as an integer in the range [0, 3]. The DEM(x) value is determined by comparing the energy Ex of the signal x(n), provided from energy computation unit 182 of FIG. 6, with three computed threshold values which are a function of an estimate of the energy of the background noise level $XB_i$, block 302.

In this step the background noise estimate is computed every 128 samples, where the next update $XB_{i+1}$ is computed as:

$$XB_{i+1} = \min(Ex, 160000, \max(1.00547 XB_i, XB_i+1)). \quad (17)$$

The three thresholds values are computed as a function of $XB_i$ as follows:

$$T_1(XB_i) = -(3.160500 \times 10^5) XB_i^2 + 10.35\ XB_i + 704.44; \quad (18)$$

$$T_2(XB_i) = -(7.938816 \times 10^{-4}) XB_i^2 + 26.00\ XB_i + 1769.48;\ \text{and} \quad (19)$$

$$T_3(XB_i) = -(3.160500 \times 10^{-4}) XB_i^2 + 103.5\ XB_i + 7044.44. \quad (20)$$

The energy Ex of the far-end signal is again compared with these three thresholds. If Ex is greater than all three thresholds, DEM(x)=3, indicating that speech is present. If Ex is greater than T1 and T2 but not T3, then DEM(x)=2, indicating that unvoiced speech is probably present. If Ex is greater than T1 but not T2 and T3, DEM(x)=1. And finally if Ex is less than all three thresholds, DEM(x)=0, indicating that no speech is present. The value of DEM(x) is provided from differential energy magnitude unit 184 to state machine 180.

Similarly, the differential energy magnitude of signal e, DEM(e), is computed and used to determine whether the near-end speaker is speaking. The DEM(e) is in the preferred embodiment also provided as an integer value in the range of [0,3]. The DEM(e) is determined by comparing the energy $E_e$ of the signal e(n), provided from energy computation unit 182 of FIG. 6, with the following three computed thresholds in block 304:

$$T_1(EB_i) = -(6.930766 \times 10^{-6})\ EB_i^2 + 4.047152\ EB_i + 289.7034; \quad (21)$$

$$T_2(EB_i) = -(1.912166 \times 10^{-5})\ EB_i^2 + 8.750045\ EB_i + 908.971;\ \text{and} \quad (22)$$

$$T_3(EB_i) = -(4.946311 \times 10^{-5})\ EB_i^2 + 18.89962\ EB_i + 2677.431 \quad (23)$$

where the background noise estimate of signal e(n) is also updated every 128 samples as:

$$EB_{i+1} = \min(Ee, 160000, \max(1.00547 EB_i, EB_i+1)). \quad (24)$$

If Ee is greater than all three thresholds, DEM(e)=3, indicating that near-end speech is present. If Ee is greater than T1 and T2 but not T3, then DEM(e)=2, indicating that unvoiced near-end speech is probably present. If Ee is greater than T1 but not T2 and T3, DEM(e)=1. And finally if Ee is less than all three thresholds, DEM(e)=0, indicating that no speech is present. The value of DEM(e) is also provided from differential energy magnitude unit 184 to state machine 180.

Once the values of DEM(x) and DEM(e) are computed, the values of $XB_i$ and $EB_i$ are updated per Equations (17) and (24) in block 306. It should be noted that both $XB_i$ and $EB_i$ are initialized to a value of 160000.

By using differential energy measurements that track the background noise level, an accurate determination of whether someone is speaking can be made even in high levels of background noise. This aids state machine 180 in FIG. 6 in making correct state determinations.

As mentioned previously, a noise analysis computation is performed in the periodic function computation step. When the function select, block 300, detects that the state machine is of a state "0" for the current sample, a determination is made as to whether the last 256 samples, including the current sample, were all of a state machine state "0", block 308. If so a linear predictive coding (LPC) method, traditionally used for vocoding speech, is used to compute the spectral characteristics of the noise. However if all of these samples were not of state "0" the LPC method is skipped.

The LPC method models each sample as being produced by a linear combination of past samples plus an excitation. When neither speaker is talking, the error signal e(n) is passed through a prediction error filter (noise analysis element 166 of FIG. 5) to remove any short-term redundancies. The transfer function for this filter is given by the equation:

$$A(z) = 1 - \sum_{i=1}^{P} a_i z^{-i} \quad (25)$$

where the order of the predictor in the exemplary embodiment is 5 (P=5).

The LPC coefficients, $a_i$, are computed from a block of 128 samples using the autocorrelation method, block 310, with Durbin's recursion, block 312, as discussed in the text *Digital Processing of Speech Signals* by Rabiner & Schafer, which is a well known efficient computational method. The first 6 autocorrelation coefficients R(0) through R(5) are computed as:

$$R(k) = \sum_{m=0}^{127-k} e(m) \, e(m+k). \quad (26)$$

The LPC coefficients are then computed directly from the autocorrelation values using Durbin's recursion algorithm. The algorithm can be stated as follows:

(1) $E^{(0)} = R(0), \, i = 1$ (27)

(2) $k_i = \left\{ R(i) - \sum_{j=1}^{i-1} \alpha_j^{(i-1)} R(i-j) \right\} / E^{(i-1)}$ (28)

(3) $\alpha_i^{(i)} = k_i$ (279)

(4) $\alpha_j^{(i)} = \alpha_j^{(i-1)} - k_i \alpha_{i-j}^{(i-1)} \quad 1 <= j <= i - 1$ (30)

(5) $E^{(i)} = (1 - k_i^2) \, E^{(i-1)}$ (31)

(6) If $i < P$ then goto (2) with $i = i + 1$. (32)

(7) The final solution for the *LPC* coefficients is given as $a_j = \alpha_j^{(P)} \quad 1 <= j <= P$ (33)

Once the LPC coefficients are obtained, synthesized noise samples can be generated with the same spectral characteristics by passing white noise through the noise synthesis filter (noise synthesis element 168 of FIG. 5) given by:

$$\frac{1}{A(z)} = \frac{1}{1 - \sum_{i=1}^{P} a_i z^{-i}} \quad (34)$$

which is just the inverse of the filter used for noise analysis.

It should be understood that in the exemplary embodiment, LPC coding techniques provide a excellent method for modeling the noise. However other techniques can be used for modeling the noise, or no noise modeling may be used at all.

As a further function of the periodic function computation step, a tap shifting algorithm is employed to account for varying echo delays. This computation is performed upon initial sample processing for a call, and optionally upon every 256 samples, provided that the ERLE is greater than 10 dB, block 314. Should the ERLE be greater than 10 dB, an indication that some cancellation is present, the largest tap, i.e., filter coefficient of the largest value, in the initial filter (filter 156 of FIG. 5) is determined, block 316, in flat delay computation unit 190 of FIG. 6. A shifting of the taps is then undertaken to process a greater number of the samples from the echo dispersion region and lesser from the flat delay region, block 318. The shifting of the taps is a determined placement of a greater number of echo dispersion region samples from the buffer to the state filter and echo canceller filter than would normally occur. A recomputation of the energy averages on these samples is undertaken, block 320. Once the tap shifting algorithm is completed or any of the other two computations of the periodic function computation step are completed the Fcount is incremented, block 322 and the subroutine exited.

With respect to the echo delay adjustment, since the distance between the echo canceller at the base station and the hybrid in the telephone network can vary widely between calls, the flat delay of the echo signal also has a wide range. We can quickly estimate the range of this delay by assuming that the U.S. is 3000 miles across and electrical signals propagate at ⅔ the speed of light. Since the round-trip distance is 6000 miles, the maximum flat delay is approximately:

$$\frac{[(6000 \text{ miles}) \times (1609.34 \text{ meters/mile})]}{[2 \times 10^5 \text{ meters/ms}]} = 48.3 \text{ ms}. \quad (35)$$

The network echo canceller of the present invention accounts for the different values of flat delay found in different calls so that more taps operate on the echo dispersion region instead of being "wasted" on the flat delay region. For example, in a traditional echo canceller with no tap-shifting mechanism, a flat delay of 16 ms would cause the first 128 taps of the echo canceller to be close to zero because the 128 most recent samples in the filter delay line are not correlated with the echo sample entering the canceller. The actual echo signal would therefore only be cancelled by the remaining 128 taps. In contrast, the NEC of the present invention automatically determines that the flat delay is 16 ms and shifts the taps to operate on older samples. This strategy utilizes more taps on the echo dispersion region, which results in better cancellation.

Figure 10:
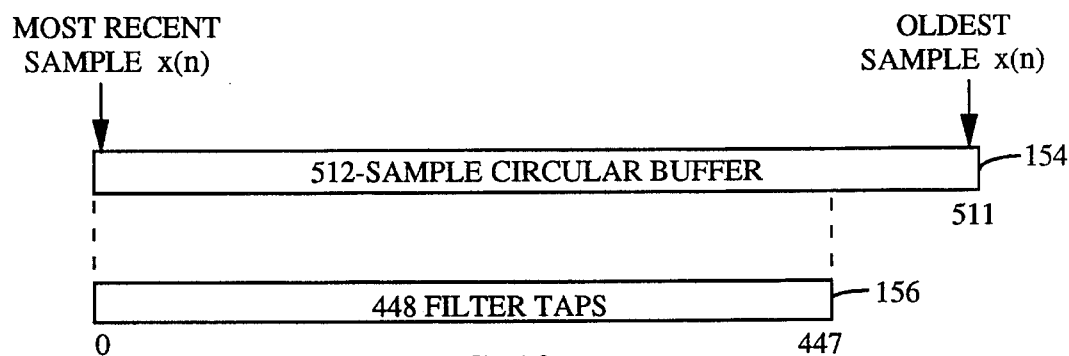
FIG. 10 is a diagram illustrating the circular-end sample buffer and initial filter tap position.

The NEC of the present invention stores 512 samples of the far-end speech x(n) in a circular buffer (buffer 154 of FIG. 5), which corresponds to a delay of 64 ms. When the canceller starts up, it initially adapts, in initial filter 156 of FIG. 5, 448 filter taps on the 448 most recent samples as shown in FIG. 10.

After obtaining initial convergence with the taps in this position, the algorithm determines the flat delay within flat delay computation unit 190 by finding the largest tap value and its respective position in the tap buffer of the initial filter 156. The tap number of the largest tap (denoted Tmax) corresponds to the flat delay because it is the time (in 8 kHz samples) for a far-end speech sample to be output from the echo canceller, reflect off the hybrid, and return to the input of the echo canceller. Instead of shifting the taps by Tmax, the algorithm leaves a safety margin of 32 samples in case the echo channel response changes slightly. The actual tap shift value is given by:

$$\text{Tshift} = \text{MAX}[0, \text{MIN}(\text{Tmax}-32, 256)]. \quad (36)$$

Figure 11:
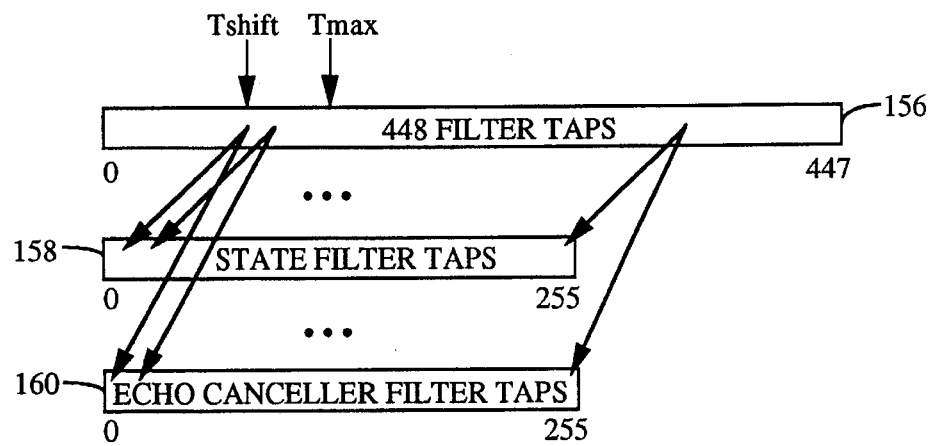
FIG. 11 is a diagram illustrating the tap buffer and a copying of the initial filter taps into the state filter and the echo canceller filter.
Figure 12:
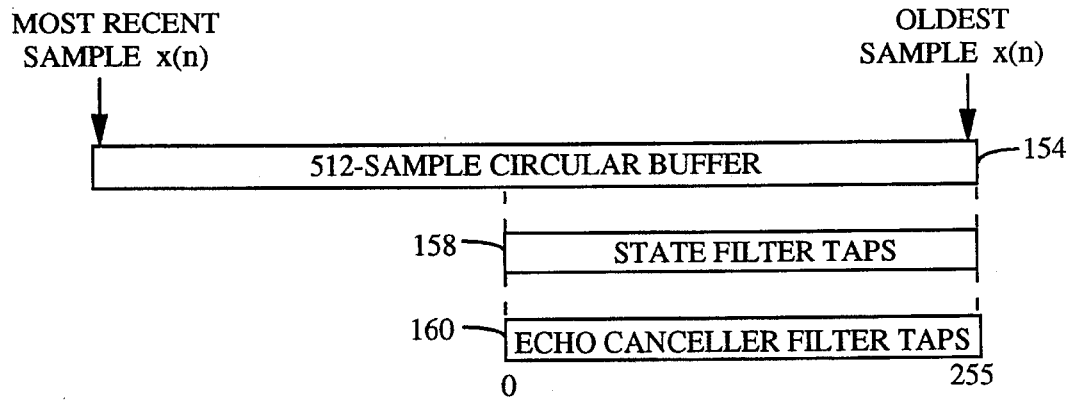
FIG. 12 is a diagram illustrating the tap buffer and a maximum shift of the filter tap positions of the state filter and echo canceller filter with respect to the samples.

Once Tshift is determined, the initial filter taps starting from Tshift are copied into both of the state filter and the echo canceller filter by flat delay computation unit 190 as illustrated in FIG. 11. An offset by Tshift into the circular buffer is used so that the zeroth filter tap of both the control filter and the echo canceller filter lines up with the sample that arrived Tshift places before the most recent sample. FIG. 12 illustrates the maximum shift so as to permit an echo coverage of 64 ms. After the taps have been shifted to operate on older samples, the energy measurements Ex(n) and Exx(n) are correspondingly modified to measure the sum of squares of these older samples.

As described herein for purposes of illustration, three adaptive filters have been described. However, it should be understood that in the various implementations, particularly in a digital signal processor, that the initial filter may also function as the state filter and the echo canceller filter using the same physical memory.

Figure 13:
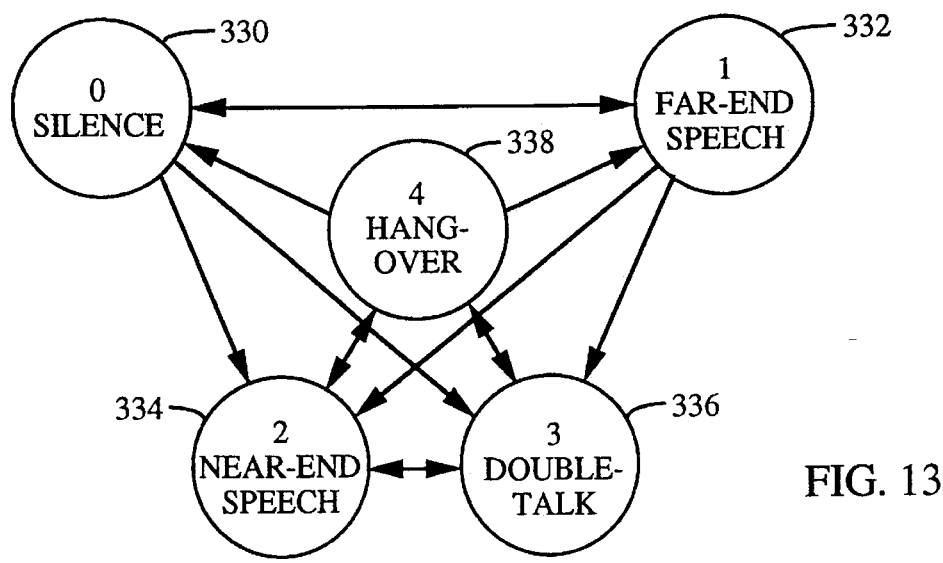
FIG. 13 is a state machine diagram illustrating the various states of the echo canceller.

Upon exiting of the periodic function computation step at point D, FIGS. 7 and 9, a state machine control algorithm is executed by state machine 180 (FIG. 6). The state machine control algorithm can be modeled as a state machine with five states, as shown in FIG. 13. The state machine control algorithm as embodied in state machine 180 can result in a change in state with each new sample.

State 0, block 330, is the silence state, where neither speaker is talking. Neither the state filter or the echo canceller filter adapts in this state to prevent divergence from the echo channel If the NEC remains in state 0 for 256 consecutive sample times, the control algorithm initiates the noise analysis routine in FIG. 9, to code the frequency characteristics of the background noise using LPC analysis.

If the far-end speaker is the only one talking, the NEC enters state 1, block 332, in which the state filter always adapts. The echo canceller filter adapts if the ERLE of either filter is above the adaptation threshold VT. The noise synthesis routine generates noise (using the LPC coefficients obtained during the last interval of silence) to replace any residual echo. In effect, the NEC has infinite ERLE in state 1 because no matter how loud the far-end speech x(n) is, the echo residual will never be passed back to the mobile.

If the near-end speaker is the only person talking, the NEC enters state 2, block 334. Here, the state machine freezes adaptation of both filters and outputs the signal e(n). If the near-end speaker stops talking, the NEC transitions to state 4 (hangover), with a hangover of 50 ms in the exemplary embodiment, before transitioning to state 0 (silence). This hangover accounts for possible pauses in near-end speech. If the far-end speaker starts to talk, the NEC transitions to state 3 (doubletalk).

In state 3, block 336, which is the doubletalk state, the state machine freezes adaptation of the echo canceller filter and outputs e(n). If the hybrid loss is above 3 dB, the state machine control algorithm permits the state filter to adapt to account for a possible change in the echo channel impulse response. For example, suppose both filters are converged, the far-end speaker is the only one talking, and the echo channel changes abruptly. This situation might occur, for example, if someone picks up an extension phone so that the mobile station speaker is talking to two people on the land-telephone side simultaneously. In this case the ERLE of both filters would suddenly drop and the NEC would shift to the doubletalk state, mistaking the echo signal for near-end speech. Although both filters would normally be frozen in doubletalk, in this case if both filters are not allowed to adapt, the NEC will remain in this state until the call terminates. However the NEC uses the hybrid loss to determine whether the state filter is allowed to adapt. As the state filter adapts, its ERLE will rise as it reacquires the new echo channel, and the NEC will recover out of state 3 (doubletalk). As shown in the state diagram, the only way to exit state 3 (doubletalk) is through the state 4 (hangover), which is only entered if the hybrid loss is greater than 3 dB and the ERLE of either the state filter or the echo canceller filter is above the minimum threshold MT.

State 4, block 338, is a hangover state that accounts for pauses in near-end speech. If the far-end talker is speaking and near-end speech is not detected for 100 ms in the exemplary embodiment, the NEC transitions from state 4 (hangover) to state 1 (far-end speech). If the far-end talker is not speaking and near-end speech is not detected for 50 ms in the exemplary embodiment, the NEC transitions from state 4 (hangover) to state 0 (silence). If near-end speech is detected, the control algorithm returns the NEC to either to state 2 (near-end speech) or state 3 (doubletalk).

A detailed flow diagram of the NEC state machine control algorithm is shown below in FIGS. 14a–14c. In FIGS. 14a–14c the algorithm is executed for each sample with a preliminary determination as to whether the current state is state 1 (far-end speech), block 340. If the current state is determined to be state 1 and the value of Hloss is determined to be less than 3 dB, block 342, then the control element permits an output of the value e(n), block 344. This case is indicative of the condition where for the previous sample far-end speech was present, but for the current sample doubletalk is present. Similarly, should the current state be determined to be neither of states 1, 2, or 3, (far-end speech, near-end speech and doubletalk) respectively in blocks 340, 346, and 348, the value of e(n) is permitted to be output, block 344, with output control provided by the state machine. A determination is then made as to the next state the NEC is to be in for processing the next sample, with the next state determination, starting at point E in the control state machine algorithm.

Returning to block 340, if the current state is determined to be state 1 (far-end speech), and Hloss is determined to be greater than 3 dB, block 342, the state filter is permitted to adapt, block 350. The ERLE and ERLE1 are then checked against VT and if either one is greater than VT, blocks 352 and 354, then the echo canceller filter is permitted to adapt, block 356. However should in both blocks 352 and 354 the ERLE and ERLE1 not be greater than VT, the echo canceller filter is not adapted. In either case a synthesized noise sample is generated, block 358, by the synthesized noise element under the control of the control element using the LPC coefficients obtained during the last interval of silence. The synthesized noise sample s(n) is output, block 360, with output control provided by the control element. A determination is then made as to the next state the NEC is to be in for processing the next sample, with the next state determination starting at point E.

At point E the program execution enters a next state subroutine. Should the value of DEM(x) not be greater than or equal to the integer value of 2, block 362, a check is made to determine if DEM(e) is less than or equal to 1, block 364. If DEM(e) is not less than or equal to 1 then the state machine transitions to a next state of 2 (near-end speech), block 366. However, should DEM(e) be less than or equal to 1 then the state machine transitions to a next state of 0 (silence), block 368. Whether a transition is made to state 2 or 0, the routine proceeds to point F in the state machine control algorithm for hangover determination.

However, upon entering the next state subroutine at point E should the value of DEM(x) be greater than or equal to 2, block 362, the value of DEM(e) is determined if it is equal to 3, block 370. If not, the next state is determined to be 1 (far-end speech), block 372, and the routine proceeds to point F in the control state machine algorithm for hangover determination. If in block 370 the value of DEM(e) is determined to be equal to 3, then a check is made to determine if each of Hloss, ERLE, and ERLE1 is less than 3 dB, blocks 374, 376 and 378. If in blocks 374, 376 and 378, any one of the values is less than 3 dB the next state is determined to be state 3 (doubletalk), block 380. However, if in blocks 374, 376 and 378, each value is greater than or equal to 3 dB, the next state is determined to be state 1 (far-end speech), block 372. From block 380 and block 372 as before the routine proceeds to point F in the control state machine algorithm for hangover determination.

Returning back to block 346, where entry is made to this block if the current state is determined not to be state 1 (far-end speech) in block 340, the determination is made if the current state is state 2 (near-end speech). If the current state is state 2 then the value of e(n) is output, block 382. A determination is then made as to the next state by first determining if DEM(x) is equal to 3, block 384, and if so the next state is set to state 3 (doubletalk), block 386. However if DEM(x) is not equal to 3 a determination is made if DEM(e) is greater than or equal to 2, block 388.

If in block 388 DEM(e) is determined to be greater than or equal to 2 the next state is set to remain as the current state, state 2 (near-end speech), block 390. However, if in block 388 DEM(e) is determined not to be greater than or equal to 2 a determination is made whether DEM(x) is less than or equal to 1, block 392. If in block 392 DEM(x) is determined not to be less than or equal to 1 then the next state is set to be state 3 (doubletalk), block 386. Should in block 392 DEM(x) be determined to be less than or equal to 1 then the next state is set to be state 4 (hangover), block 394. Additionally in block 394 an internal counter, Hcounter (not shown), in the control element is set to a Hcount value of 400. From blocks 386, 390 and 394 the routine proceeds to point F in the control state machine algorithm for hangover determination.

Returning back to block 346, if the result of the determination is that the current state is not state 2 (near-end speech) a determination is made in block 348 if the current state is state 3 (doubletalk). If the current state is state 3 then the value of e(n) is output, block 396. A determination is then made as to the next state by first determining if DEM(x) is equal to 3, block 398, and if not the routine proceeds to block 388 for state determination as discussed above. However if DEM(x) is equal to 3 a determination is made if Hloss is greater than 3 dB, block 400. If in block 400 Hloss is not greater than 3 dB, the next state is set to state 3 (doubletalk), block 386. Should Hloss be greater than 3 dB then the state filter is permitted to adapt, block 402.

Upon permitting the state filter to adapt, a determination is made whether ERLE is greater than MT, block 404, and if not then a determination is made whether ERLE1 is greater than MT, block 406. If either ERLE or ERLE1 is greater than MT then the next state is set to state 4 (hangover), block 408. However if ERLE1 is not greater than MT then the next state is set to state 3 (doubletalk), block 386. If the next state is set to state 4 in block 408 the Hcount is set to 800. From blocks 386 and 408 the routine proceeds to point F in the state machine control algorithm for hangover determination.

The hangover routine ensures that a delay occurs between the transition from a near-end speech state or a doubletalk state to a state of far-end speech or silence. Once the hangover determination routine is entered at point F, a determination is made as to whether the current state is state 4 (hangover), block 410. Should the current state not be state 4 the state machine control algorithm routine is exited, with the routine returning to point A of FIG. 7.

Should in block 410 the current state be determined to be state 4, a determination is made if the next state has been set to a state less than state 2, i.e. state 1 (far-end speech) or state 0 (silence), block 412. If the next state is determined in block 412 not to be state 0 or 1, the state machine control algorithm subroutine is exited, with the subroutine returning to point A of FIG. 7. However, should the next state be determined to be state 0 or 1, the Hcount is decremented, block 414, with a determination then made if the Hcount is equal to 0, block 416. If the Hcount is determined to be equal to 0 then the state machine control algorithm subroutine is exited, with the subroutine returning to point A of FIG. 6. However if the Hcount is not equal to 0 then the next state is set to state 4, block 418, and the state machine control algorithm subroutine is exited, with the subroutine returning to point A of FIG. 7.

It should be understood that many of the parameters as discussed with respect to the exemplary embodiment may be modified within the scope of the teachings of the present invention. For example, the hangover delay may be changed as may be other parameters, such as thresholds values, the number of threshold levels or filter step size values.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An echo canceller system for cancelling an echo receive channel signal from a return channel, said echo receive channel signal being introduced into said return channel from an echo channel in communication with said return channel, said system comprising:

an automatic gain control unit for receiving a far-end signal from a far-end channel and for scaling said far-end signal in accordance with a gain control signal to provide a controlled dynamic range signal; and echo canceller means, coupled to said automatic gain control unit, for receiving said controlled dynamic range signal from said automatic gain control unit and for receiving from said return channel a combined signal comprised of said echo receive channel signal and an input return channel signal, for subtracting an estimate of said echo receive channel signal from said return channel and for providing said gain control signal to said automatic gain control unit.

2. The system of claim 1 wherein said echo canceller means comprises:

first filter means for generating first filter coefficients, generating a first echo estimate signal with the first filter coefficients, and updating the first filter coefficients in response to a first filter control signal;

first summing means for subtracting the first echo estimate signal from the combined signal to generate a first echo residual signal;

second filter means for generating second filter coefficients, generating a second echo estimate signal with the second filter coefficients, and updating the second filter coefficients in response to a second filter control signal;

second summing means for subtracting the second echo estimate signal from the combined signal to generate a second echo residual signal, and providing upon the return channel the second echo residual signal; and control means for determining from the receive channel signal, the combined signal, and the first and second echo residual signals, one of a plurality of control states wherein a first control state is indicative of a receive channel signal above a first predetermined energy level, wherein when the control means is in the first control state generating the first control signal and generating the second control signal when at least one of a first energy ratio of the first echo residual signal and the combined signal and a second energy ratio of the second echo residual signal and the combined signal exceed a first predetermined energy ratio level.

3. A method for performing echo canceling in an echo canceller comprising the steps of:

receiving a far-end signal from a far-end channel in communication with said echo canceller;

scaling said far-end signal to provide a controlled range signal within a predefined dynamic range, said controlled range signal being incident upon an echo channel;

receiving an echo signal from said echo channel; and echo canceling said echo signal at least partially on the basis of magnitude of said controlled range signal.

4. The method of claim 3 further including the step of determining an echo estimate, said step of determining an echo estimate comprising the steps of:

generating a first set of filter coefficients;

generating from a receive channel signal and said first set of filter coefficients a first echo estimate;

subtracting the first echo estimate signal from a combined return channel and echo receive channel signal to generate a first echo residual signal;

generating a second set of filter coefficients;

generating from the receive channel signal and the second set of filter coefficients a second echo estimate;

subtracting the second echo estimate signal from the combined signal to generate a second echo residual signal;

providing upon the return channel the second echo residual signal;

updating the first set of filter coefficients when the receive channel signal is above a first predetermined energy level; and updating the second filter coefficients when at least one of a first energy ratio of the first echo residual signal and the combined signal and a second energy ratio of the second echo residual signal and the combined signal exceed a first predetermined energy ratio level.

* * * * *